United States Patent
Kawashiri et al.

(10) Patent No.: US 10,322,756 B2
(45) Date of Patent: Jun. 18, 2019

(54) WORK VEHICLE

(71) Applicant: YANMAR CO., LTD., Osaka-shi, Osaka (JP)

(72) Inventors: Shinya Kawashiri, Osaka (JP); Kiyoyuki Okuyama, Yamagata (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 14/907,101

(22) PCT Filed: Jun. 20, 2014

(86) PCT No.: PCT/JP2014/066377
§ 371 (c)(1),
(2) Date: Jan. 22, 2016

(87) PCT Pub. No.: WO2015/012031
PCT Pub. Date: Jan. 29, 2015

(65) Prior Publication Data
US 2016/0152278 A1 Jun. 2, 2016

(30) Foreign Application Priority Data

Jul. 24, 2013 (JP) .................................. 2013-154028

(51) Int. Cl.
*B62D 25/08* (2006.01)
*B62D 25/10* (2006.01)
(Continued)

(52) U.S. Cl.
CPC ......... *B62D 25/105* (2013.01); *B60Q 1/0035* (2013.01); *B60Q 1/0041* (2013.01); *B60Q 1/18* (2013.01); *B60Q 1/22* (2013.01); *B60Q 1/24* (2013.01); *B60Q 1/2607* (2013.01); *B60Q 1/2665* (2013.01); *B60Q 1/32* (2013.01); *B60Q 1/34* (2013.01); *B60Q 1/44* (2013.01); *B60R 1/06* (2013.01);
(Continued)

(58) Field of Classification Search
CPC ...... B62D 25/08; B62D 25/085; B62D 25/10; B62D 25/105; B62D 25/12; B62D 49/0614; B60Q 1/0408; B60Q 1/0035
See application file for complete search history.

(56) References Cited

U.S. PATENT DOCUMENTS 2,020,897 A * 11/1935 Lint ..................... B60Q 1/0017
362/496
3,760,781 A * 9/1973 Boldt ....................... F02P 11/02
123/198 DC
(Continued)

FOREIGN PATENT DOCUMENTS

JP   2001063407 A   3/2001
JP   2003237634 A   8/2003
(Continued)

OTHER PUBLICATIONS

International Search Report corresponding to Application No. PCT/JP2014/066377; dated Aug. 19, 2014, with English translation.

*Primary Examiner* — Frank B Vanaman
(74) *Attorney, Agent, or Firm* — Norton Rose Fulbright US LLP

(57) ABSTRACT

A tractor which is a passenger work vehicle includes: a drive operating unit; and a hood arranged in front of the drive operating unit. In the tractor, the height of the hood from the ground is reduced from the rear end to the front end of the hood constituted of an upper surface, an upper left surface and an upper right surface, and is reduced from the center of the hood in the right-left direction to the right and the left of the hood. When viewed from a plane, the left-side ridge line on the upper left surface and the right-side ridge line on the upper right surface of the hood converge at the center of the front end of the hood.

11 Claims, 28 Drawing Sheets

(51) Int. Cl.
  *B62D 25/16* (2006.01)
  *B62D 33/06* (2006.01)
  *B60Q 1/00* (2006.01)
  *B60Q 1/18* (2006.01)
  *B60Q 1/22* (2006.01)
  *B60Q 1/24* (2006.01)
  *B60Q 1/26* (2006.01)
  *B60Q 1/32* (2006.01)
  *B60Q 1/34* (2006.01)
  *B60Q 1/44* (2006.01)
  *B60R 1/06* (2006.01)
  *B60R 1/12* (2006.01)

(52) U.S. Cl.
  CPC .......... *B60R 1/1207* (2013.01); *B62D 25/10* (2013.01); *B62D 25/168* (2013.01); *B62D 33/0617* (2013.01)

(56) References Cited

U.S. PATENT DOCUMENTS

| | | | |
|---|---|---|---|
| 5,536,062 A | * | 7/1996 | Spears .................. B62D 37/02 180/903 |
| D605,669 S | * | 12/2009 | Matsumoto .................. D15/31 |
| 2002/0011364 A1 | * | 1/2002 | Bedard .................. B62D 25/12 180/68.1 |
| 2002/0088656 A1 | * | 7/2002 | Bergman .................. B60K 13/02 180/68.3 |
| 2003/0075375 A1 | * | 4/2003 | Sprinkle .................. B62D 49/02 180/291 |
| 2006/0108813 A1 | * | 5/2006 | Goebert .................. B62D 25/10 293/115 |
| 2006/0175104 A1 | * | 8/2006 | Etzler .................. B62D 25/10 180/69.2 |
| 2009/0033125 A1 | | 2/2009 | Ayabe et al. |
| 2009/0273196 A1 | | 11/2009 | Ayabe et al. |
| 2011/0094819 A1 | * | 4/2011 | Suzuki .................. B60N 2/24 180/374 |
| 2011/0115260 A1 | * | 5/2011 | Mizuta .................. B62D 25/00 296/203.01 |

FOREIGN PATENT DOCUMENTS

| | | |
|---|---|---|
| JP | 2005104271 A | 4/2005 |
| JP | 2007186151 A | 7/2007 |
| JP | 2008062705 A | 3/2008 |

* cited by examiner

WORK VEHICLE

CROSS REFERENCE TO RELATED APPLICATIONS

This is the U.S. national stage of application No. PCT/JP2014/066377, filed on Jun. 20, 2014. Priority under 35 U.S.C. § 119(a) and 35 U.S.C. § 365(b) is claimed from Japanese Application No. 2013-154028, filed Jul. 24, 2013, the disclosure of which is also incorporated herein by reference.

TECHNICAL FIELD

The present invention relates to a work vehicle.

BACKGROUND ART

Conventionally, regarding passenger work vehicles, there have been known work vehicles in which an engine room that stores an engine and the like in front of a drive operating unit is arranged. Regarding the aforementioned work vehicles, some work vehicles each have a hood whose height from the ground is reduced from a rear end (the end on the side of the drive operating unit) to a front end (the end on the side of the advancing direction), in order to secure the field of vision in front of the hood constituting the engine room. For example, Patent Literature 1 discloses the above-mentioned work vehicle.

The work vehicle in Patent Literature 1 is configured to reduce blind spots in front of an operator who sits on an operating seat of the drive operating unit (manipulating unit) by reducing the frontal height of a hood. However, in the work vehicle, an instrumental panel, a steering handle and the like in the manipulating unit are disposed at high positions with respect to the hood. Therefore, blind spots may appear in front of the operator due to the instrumental panel, the steering handle, and the like. Also, both right and left ends of the front of the hood of the work vehicle protrude with respect to the center of the front end portion of the hood when viewed from the operator, which causes the blind spots in left-side front and right-side front of the operator.

CITATION LIST

Patent Literature

PTL 1: Japanese Unexamined Patent Application Publication No. 2007-186151

SUMMARY OF INVENTION

Technical Problem

The present invention has been achieved to solve the above-mentioned problems. It is an object of the present invention to provide a work vehicle being capable of reducing blind spots that appear in front.

Solution to Problem

The problems solved by the present invention have been described above. Subsequently, the means of solving the problems will be described below.

That is, in the present invention, a work vehicle includes a drive operating unit; and a hood arranged in front of the drive operating unit. A height of the hood from ground is reduced from a rear end to a front end of the hood and is reduced from a center of the hood in a right-left direction to a right and a left of the hood. When viewed from a plane, a left-side ridge line and a right-side ridge line of the hood converge at a center of a front end of the hood.

In the present invention, the front end of the hood is formed in such a manner as to correspond to a shape of the rear end of the hood, and an instrumental panel formed on an inclined surface that tilts downward from a front end to a rear end thereof is connected to the rear end of the hood.

Advantageous Effects of Invention

The present invention provides the following advantageous effects.

According to the present invention, a proportion of the hood to the field of vision in front, left-side front, and right-side front of the operator is decreased. Also, the proportion of the hood to the field of vision in left-side front and right-side front of the operator is decreased. Consequently, the blind spots that occur in front of the work vehicle can be decreased.

According to the present invention, a proportion of the instrumental panel to the field of vision in front of the operator is decreased. Consequently, the blind spots that occur in front of the work vehicle can be decreased.

DESCRIPTION OF EMBODIMENTS

Hereinafter, a tractor 1 of an embodiment of a work vehicle according to the present invention will be described.

In the following description, the front, rear, right and left directions are defined based on the advancing direction of the tractor 1 as the front.

First, the entire constitution of the tractor 1 according to the present invention will be described referring to FIGS. 1 to 8. It is noted that the work vehicle according to the present invention is not limited to the tractor 1, but can be applied to vehicles across the board, such as other agricultural vehicles, construction vehicles, and industrial vehicles.

Figure 1:
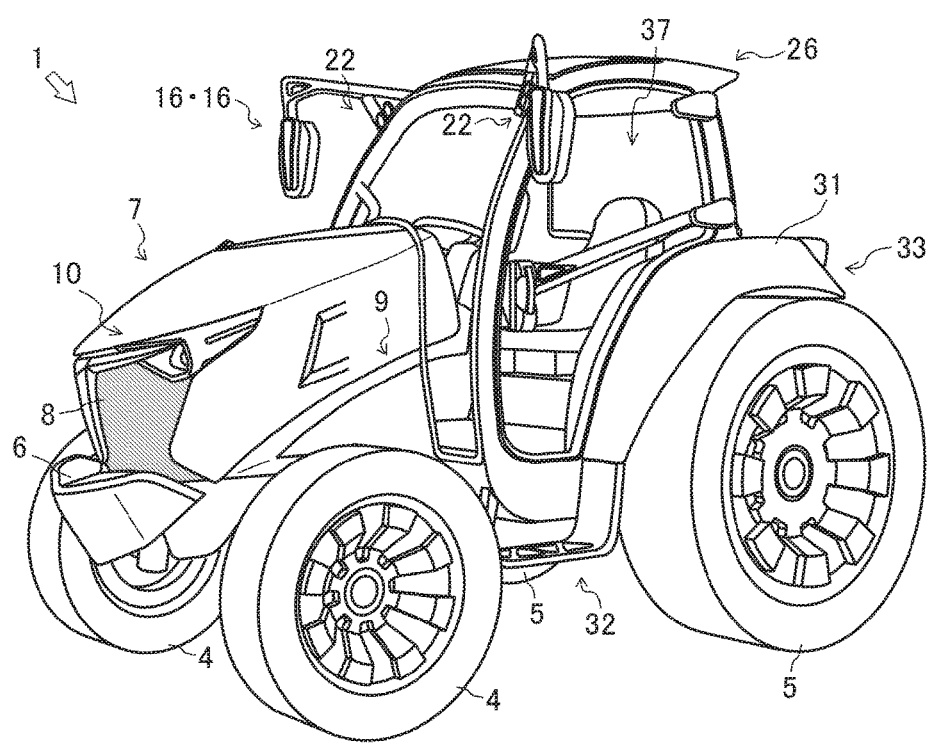
FIG. 1 is a perspective front view illustrating the entire constitution of a tractor according to an embodiment of the present invention.
Figure 2:
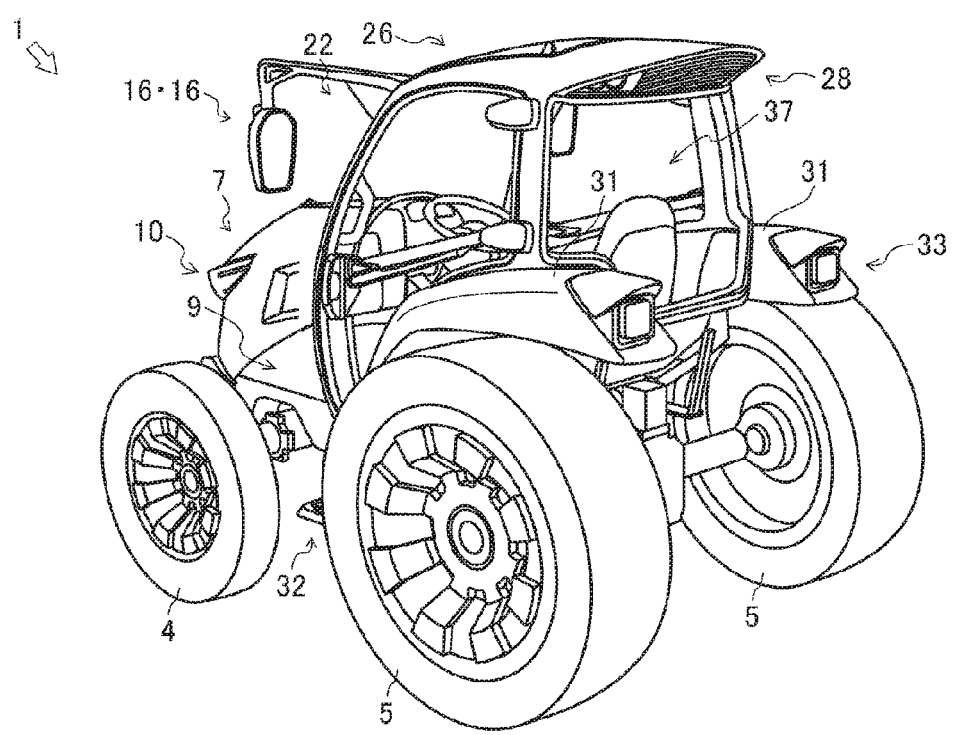
FIG. 2 is a perspective rear view illustrating the entire constitution of the tractor according to the embodiment of the present invention.

As illustrated in FIGS. 1 and 2, the tractor 1 is equipped with various work machines (rotaries and the like) and performs various works. Regarding the tractor 1, an engine 3, a hood 7, a transmission case, a front axle, a rear axle, each of which is not illustrated, a cabin 26, and a drive operating unit 37 are arranged on a machine body frame 2 of which the longitudinal direction is the back-and-front direction.

A counterweight 6 and the like are mounted on the front end portion of the machine body frame 2 via a front hitch not illustrated. The engine 3 (see FIGS. 3 and 4) is mounted on approximately the central portion of the machine body frame 2. The transmission case not illustrated that stores part of a power transmission mechanism of the tractor 1 is coupled with the rear end portion of the machine body frame 2. Also, the front portion of the machine body frame 2 is supported with a pair of right and left front wheels 4 via the front axle not illustrated. The rear portion of the transmission case is supported with a pair of right and left rear wheels 5 via the rear axle not illustrated. Thus, the tractor 1 is such that the machine body frame 2 and the transmission case are integrally constituted and supported with the front wheels 4 and the rear wheels 5.

In the tractor 1, the hood 7 and the like are arranged in such a manner as to cover the engine 3, thereby constituting the engine room. Regarding the tractor 1, a front grille 8 and head lights 10 that light up in front of the tractor 1 are provided in the front of the hood 7. In the tractor 1, the drive operating unit 37 in which an operator rides so as to operate the tractor 1 is provided in the rear of the hood 7 and above the transmission case. The tractor 1 is such that the drive operating unit 37 is covered with a cabin 26. Also, in the tractor 1, a work machine mounting device not illustrated is provided in back of the transmission case.

Regarding the tractor 1 constituted in the aforementioned manner, after the power of the engine 3 is shifted by the power transmission mechanism, the power is transmitted to the pair of right and left front wheels 4 and the pair of right and left rear wheels 5 by way of the front axle and the rear axle. The tractor 1 travels by the rotational drive of the pair of right and left front wheels 4 and the pair of right and left rear wheels 5. Also, regarding the tractor 1, after the power of the engine 3 is shifted by the power transmission mechanism, the power is also transmitted to work machines such as a cultivator, which is not illustrated but mounted via the work machine mounting device provided in back of the transmission case.

Next, the counterweight 6, the hood 7, the front grille 8, and side covers 9 will be described referring to FIG. 1.

As illustrated in FIGS. 1, 3, 4, and 5, the counterweight 6 balances the weight of the work machine mounted on the work machine mounting device. The counterweight 6 is provided on the front end portion of the tractor 1. The counterweight 6 is formed in an approximately V shape for which the center in the right-left direction protrudes to the front when viewed from a plane. Also, the upper side surface of the counterweight 6 is formed on an inclined surface that tilts downward to the center in the right-left direction. That is, the counterweight 6 is formed in a V shape when viewed from the front in the advancing direction.

Figure 3:
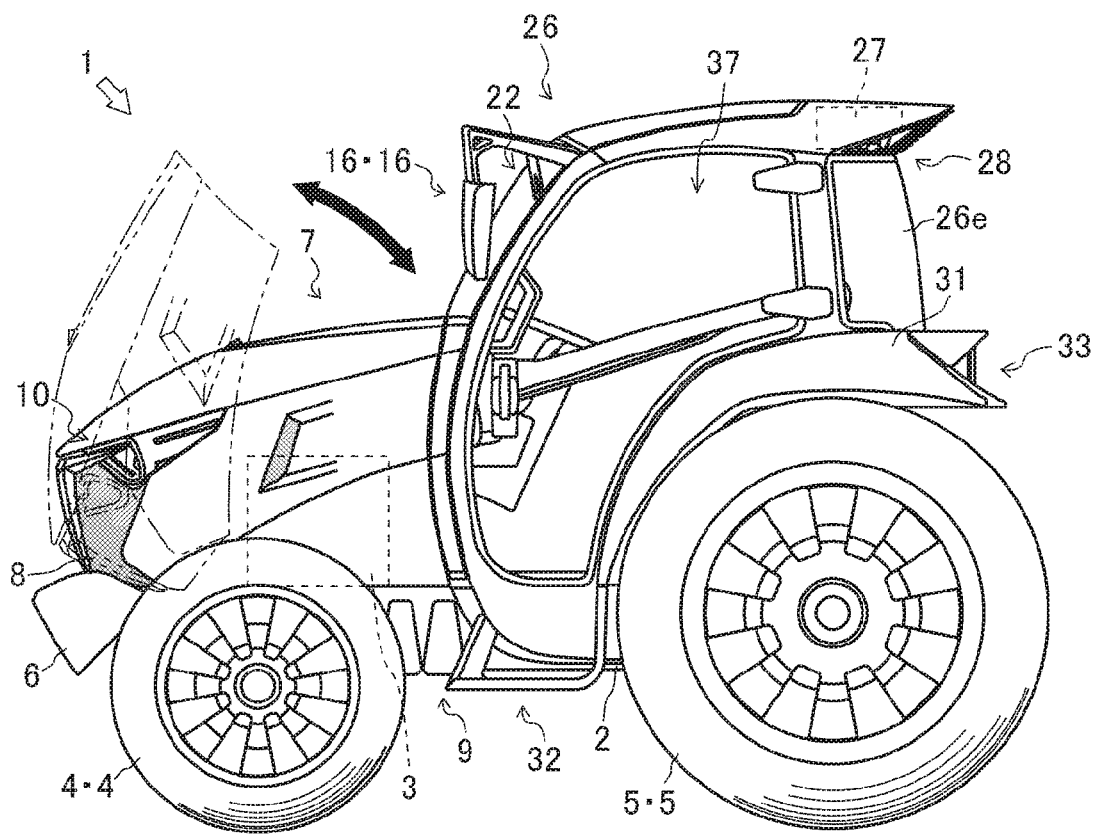
FIG. 3 is a left side view illustrating the entire constitution of the tractor according to the embodiment of the present invention.
Figure 4:
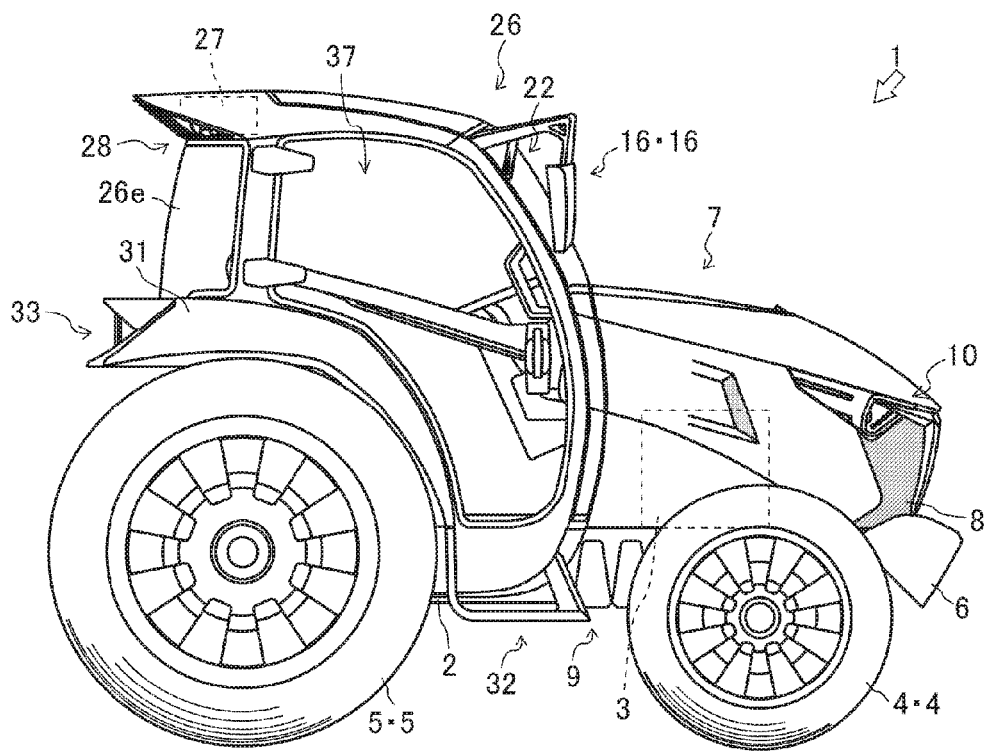
FIG. 4 is a right side view illustrating the entire constitution of the tractor according to the embodiment of the present invention.
Figure 5:
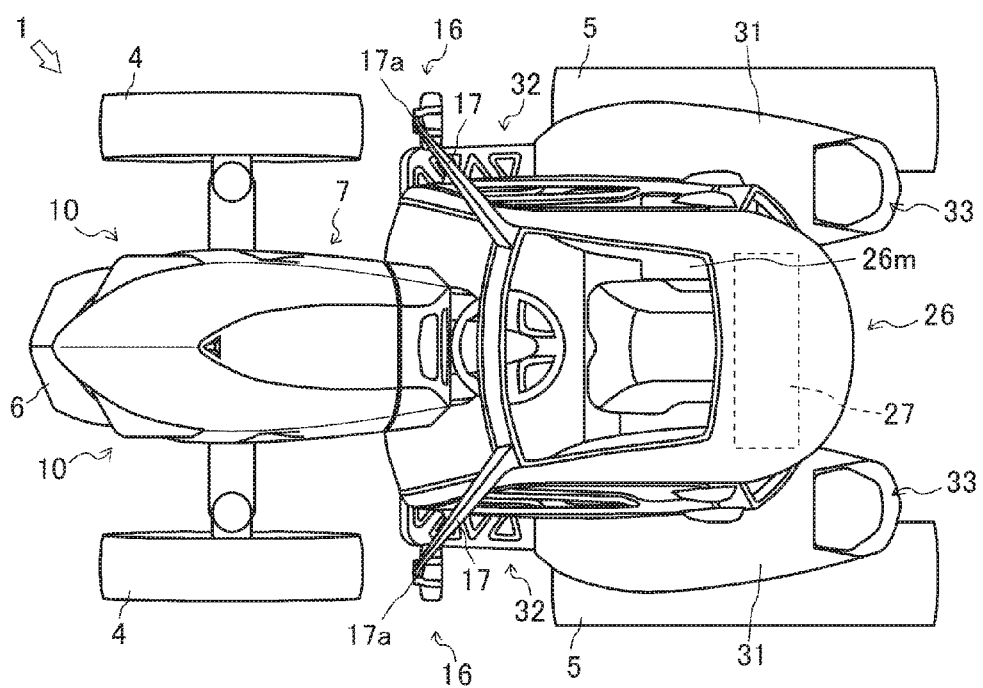
FIG. 5 is a top view illustrating the entire constitution of the tractor according to the embodiment of the present invention.
Figure 6:
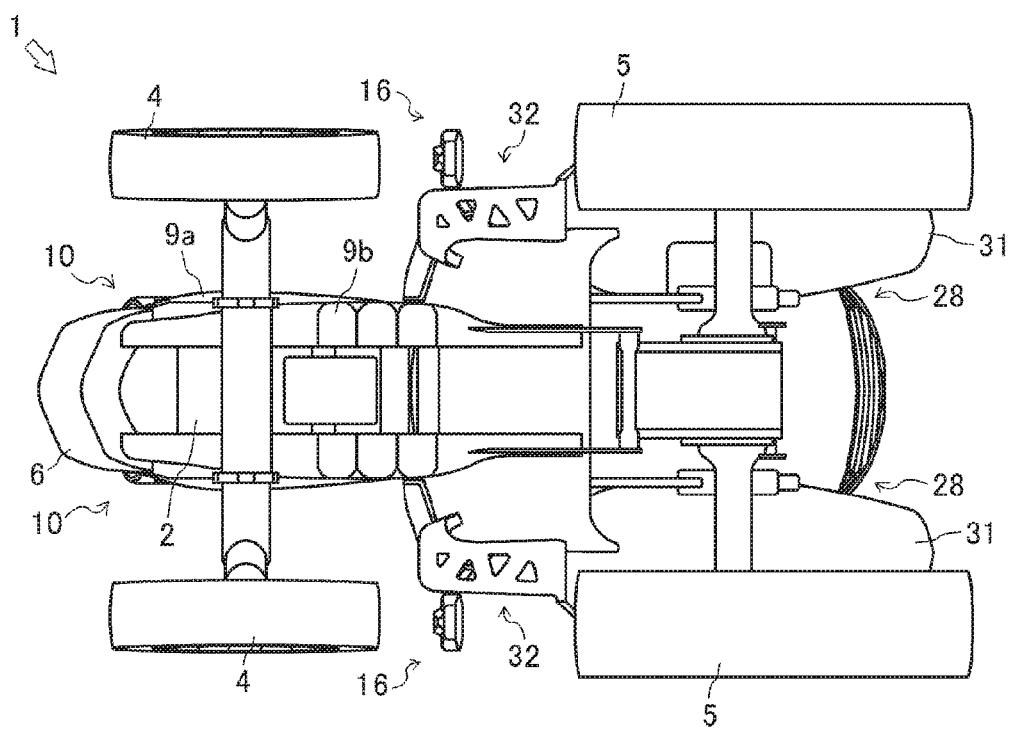
FIG. 6 is a bottom view illustrating the entire constitution of the tractor according to the embodiment of the present invention.
Figure 7:
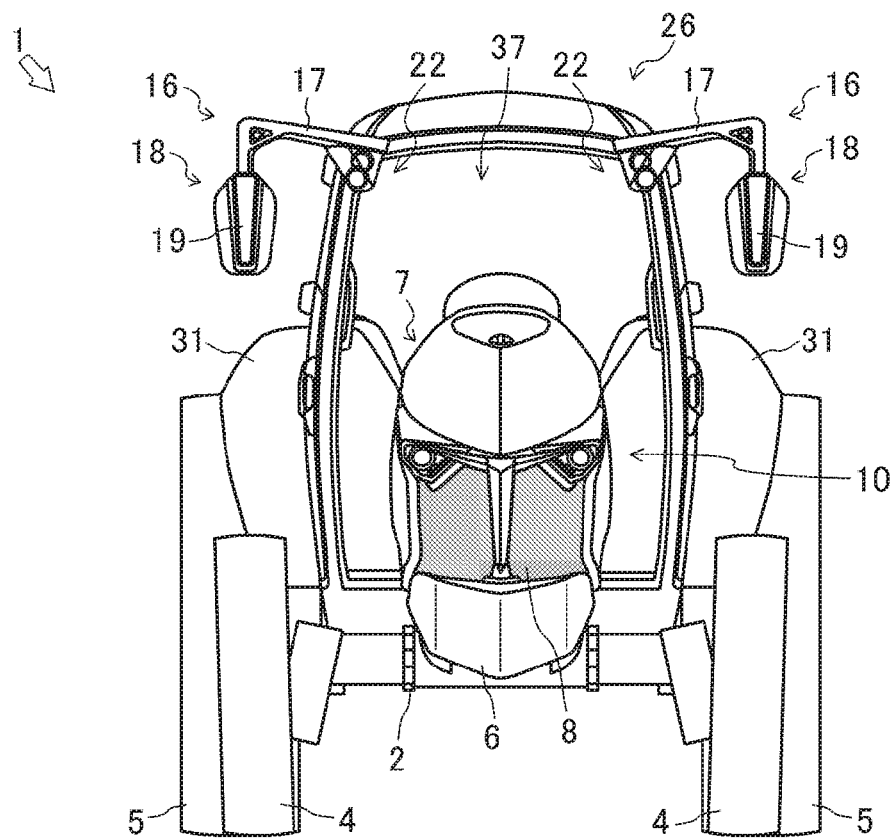
FIG. 7 is a front view illustrating the entire constitution of the tractor according to the embodiment of the present invention.

With this constitution in the aforementioned manner, regarding the tractor 1, when the hood 7 is opened and closed in such a manner that the rear end of the hood 7 faces the front, the front end portion of the hood 7 and the counterweight 6 do not contact each other (see FIG. 3).

Figure 9:
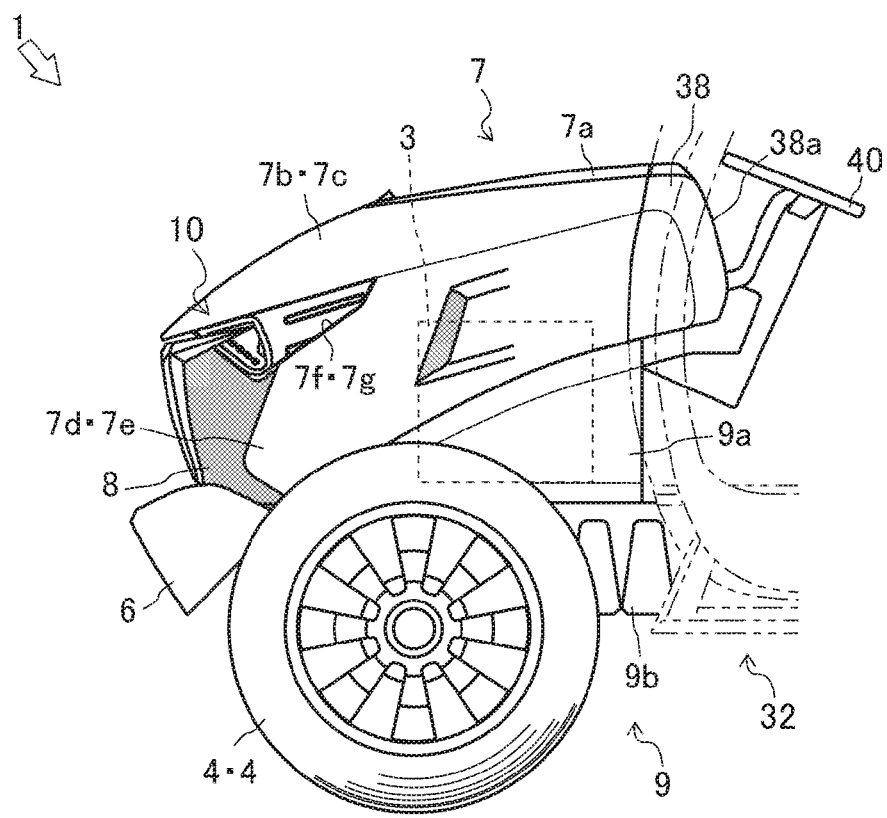
FIG. 9 is a partial enlarged side view illustrating the constitution of a hood of the tractor according to the embodiment of the present invention.
Figure 10:
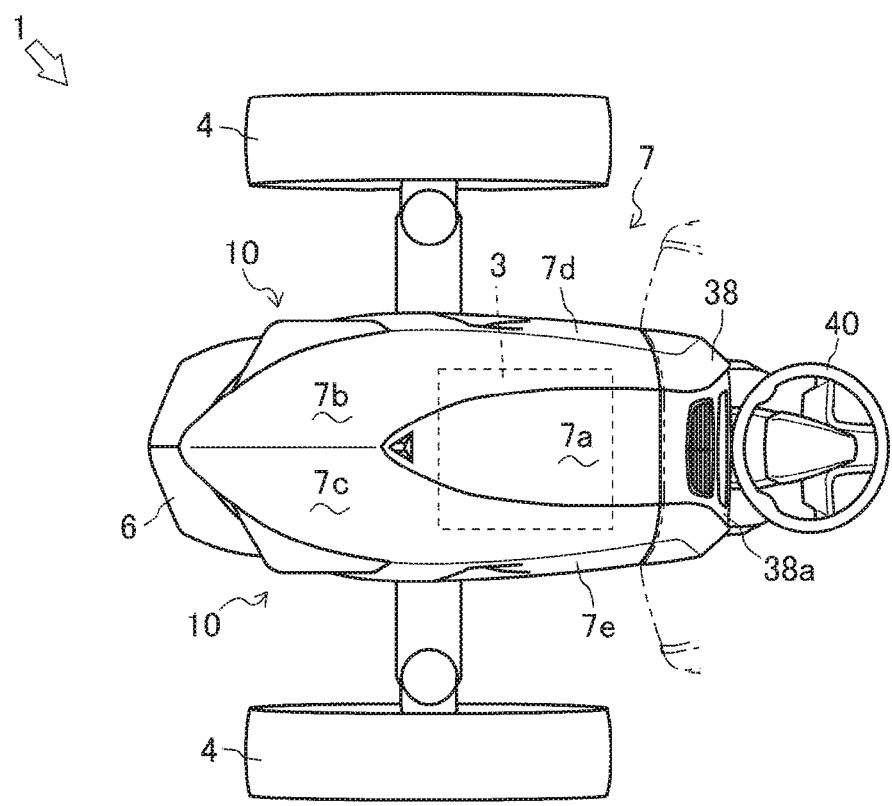
FIG. 10 is a partial enlarged top view illustrating the constitution of the hood of the tractor according to the embodiment of the present invention.

As illustrated in FIGS. 9 and 10, the hood 7 constitutes the engine room in which the engine 3 and the like are arranged. The hood 7 is provided on the machine body frame 2 in which the engine 3 is arranged while the longitudinal direction thereof is regarded as the back-and-front direction, in such a manner as to cover a section leading from the front end portion of the machine body frame 2 to the cabin 26. An opening portion is formed in the front end of the hood 7. The front grille 8 is provided in the opening portion of the hood 7. The hood 7 is configured to rotate upward about the front end portion or the rear end as a fulcrum and make the engine room openable (see a black-painted arrow in FIG. 3).

The hood 7 is constituted of an upper surface 7a, an upper left surface 7b, an upper right surface 7c, a left surface 7d, and a right surface 7e. In the hood 7, respective surfaces adjacent to each other, out of the upper surface 7a, the upper left surface 7b, the upper right surface 7c, the left surface 7d, and the right surface 7e, are integrally formed.

The upper surface 7a is formed in an approximately triangular shape whose vertex is directed to the front when viewed from a plane. The upper surface 7a constitutes part of the hood 7 in which the vertex is positioned approximately at the center in the back-forth direction of the hood 7 from the rear end of the hood 7. The upper surface 7a is formed on an inclined surface that tilts downward from the rear end to the front end of the hood 7.

The upper left surface 7b constitutes part of the hood 7 leading from the rear end of the hood 7, which is the left side of the upper surface 7a, to the front end of the hood 7. The upper right surface 7c constitutes part of the hood 7 leading from the rear end of the hood 7, which is the right side of the upper surface 7a, to the front end of the hood 7. Part of the hood 7, which is constituted of the upper left surface 7b and the upper right surface 7c, is formed such that the width in the right-left direction gradually increases from the rear end to the front end of the hood 7, and the width in the right-left direction is gradually reduced from a midway portion. Then, the hood 7 is formed in an approximately shell shape in which a left-side ridge line and a right-side ridge line converge at the center of the front end when viewed from a plane.

The upper left surface 7b and the upper right surface 7c are constituted in such a manner as to be abutted to the upper surface 7a, leading from the rear end of the hood 7 to the vertex of the upper surface 7a. Then, the upper left surface 7b and the upper right surface 7c are constituted in such a manner as to be abutted to each other in the center in the right-left direction of the hood 7, leading from the vertex of the upper surface 7a to the front end of the hood 7. The upper left surface 7b is formed on an inclined surface that tilts downward to the left. The upper right surface 7c is formed on an inclined surface that tilts downward to the right. In addition, the upper left surface 7b and the upper right surface 7c are is formed on an inclined surface that tilts downward from the vertex of the upper surface 7a to the front end of the hood 7. Accordingly, part of the hood 7, which is constituted of the upper surface 7a, the upper left surface 7b, and the upper right surface 7c, is constituted such that the heights from the ground are reduced from the rear end to the front end, and from the center in the right-left direction to the right and left respectively.

The left surface 7d constitutes part of the hood 7 in such a manner as to be abutted to the left-side end of the upper left surface 7b and face the machine body frame 2. The right surface 7e constitutes part of the hood 7 in such a manner as to be abutted to the right-side end of the upper right surface 7c and face the machine body frame 2. Discharge ports for cooling air that cools the engine 3 are formed in the left surface 7d and the right surface 7e. Notches facing the rear end of the hood 7 are formed at the upper end of the front end portion of the left surface 7d and the upper end of the front end portion of the right surface 7e. In this manner, a notch portion 7f made up of the lower end of the upper left surface 7b and the notch of the left surface 7d is constituted on the left side of the front end portion of the hood 7. Also, a notch portion 7g made up of the lower end of the upper right surface 7c and the notch of the right surface 7e is constituted on the right side of the front end portion of the hood 7.

An instrumental panel 38 is connected to the rear end of the hood 7. The shape made up of the upper surface 7a, the upper left surface 7b, the upper right surface 7c, the left surface 7d, and the rear end of the right surface 7e of the hood 7 is formed approximately similarly to the shape of the front end of the instrumental panel 38. That is, the instrumental panel 38 is successively connected to the hood 7 without steps. Also, regarding the instrumental panel 38, an inclined surface 38a that tilts downward from the connection end with the hood 7 to the drive operating unit 37 in the cabin 26 is formed. That is, the instrumental panel 38 is constituted in such a manner that the height from the ground is not higher than that of the hood 7.

Regarding the tractor 1, as the hood 7 becomes closer to the operator, the field of vision in front of the operator (including the left-side front and the right-side front) is blocked by the hood 7, which causes blind spots. That is, regarding the tractor 1, as the height of the hood 7 from the ground increases with respect to the height of the operator from the ground, the blind spots appear in the field of vision in front of the operator (hereinafter referred to as the height of each portion from the ground with respect to the height of the operator from the ground).

Figure 11A:
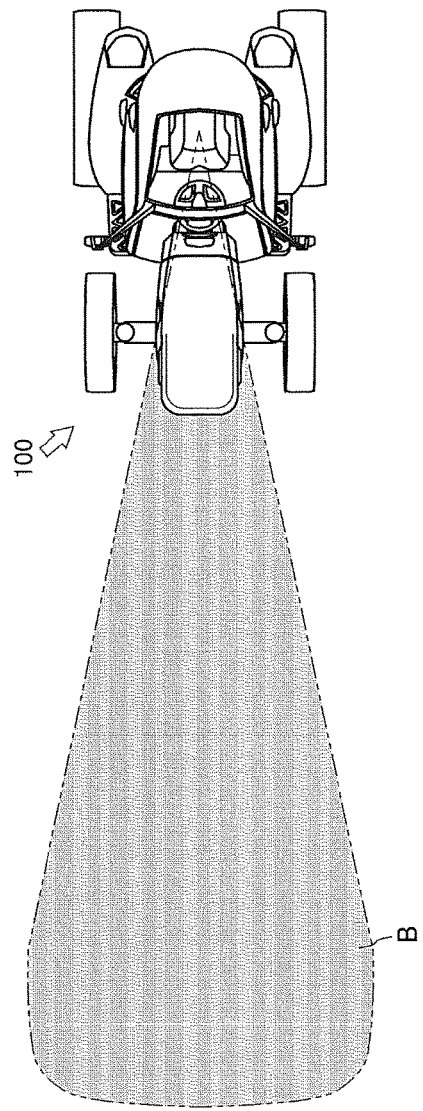
FIG. 11A is a view illustrating ranges representing blind spots from a drive operating unit of a tractor according to a conventional embodiment.

As illustrated in FIG. 11A, a tractor 100 having a conventional hood shape that is not formed in a shell shape viewed from a plane is constituted such that both right and left ends of the front of the hood are the same height as that of the center of the front end portion of the hood when viewed from an operator. Accordingly, a blind spot B of the tractor 100 includes blind spots that are caused by the both right and left ends in front of the hood.

Figure 11B:
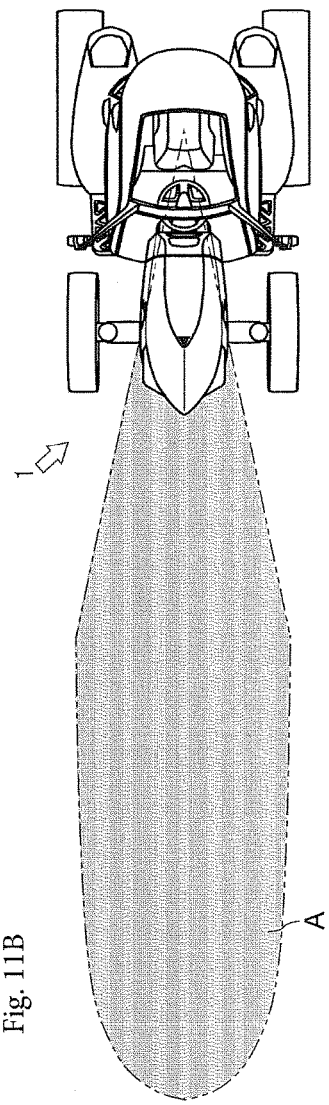
FIG. 11B is a view illustrating ranges representing blind spots from a drive operating unit of the tractor according to the embodiment of the present invention.

As illustrated in FIG. 11B, the tractor 1 of the present embodiment is constituted in such a manner that the height of hood 7 from the ground is reduced as it advances from the front end of the hood 7 and the center in the right-left direction of the hood 7 to the right and left. Also, regarding the tractor 1, the height of both right and left ends of the front end of the hood 7 is lower than that of the center of the front end portion of the hood. Also, regarding the tractor 1, the height of the instrumental panel 38 from the ground is not higher than that of the hood 7. Accordingly, a blind spot A of the tractor 1 does not include a blind spot caused by both right and left ends of the front of the hood 7 and a blind spot caused by the instrumental panel 38. That is, in the blind spot A of the tractor 1, the blind spots that occur in the left-side front and the right-side front are decreased, compared with the blind spot B of the tractor 100.

With the constitution in the aforementioned manner, regarding the tractor 1, a proportion of the hood 7 to the field of vision in front, left-side front, and right-side front of the operator is decreased. Also, regarding the tractor 1, the proportion of the hood 7 to the field of vision in left-side front and in right-side front of the operator is decreased. Furthermore, regarding the tractor 1, a proportion of the instrumental panel 38 that occupies the field of vision in front of the operator is decreased. Consequently, the tractor 1 can decrease the blind spots that occur in front thereof.

Figure 12:
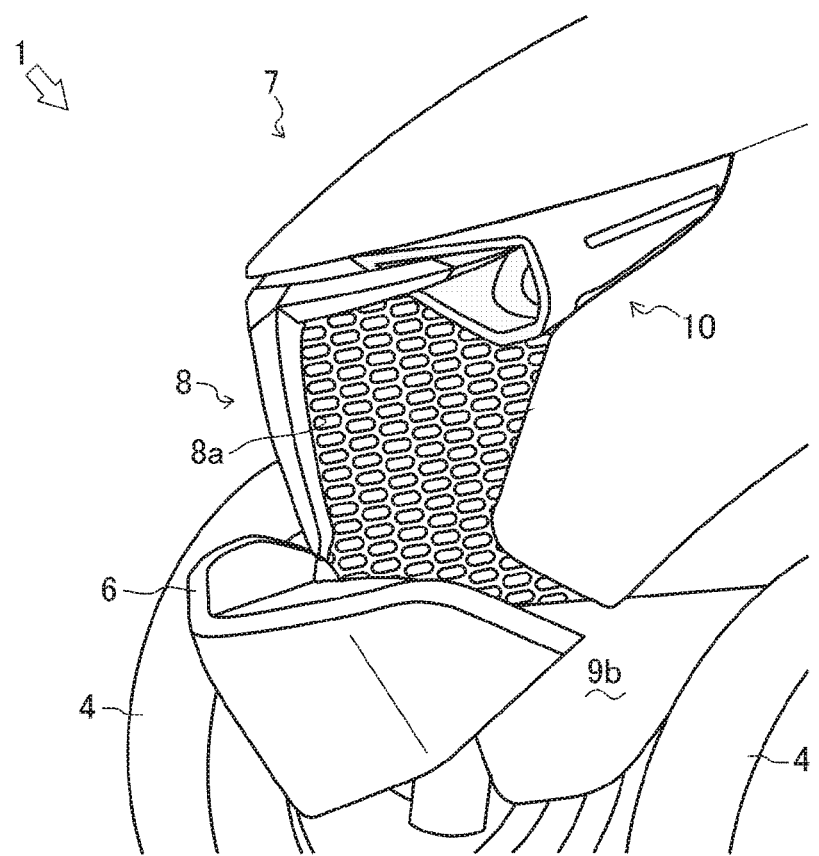
FIG. 12 is a partial enlarged perspective view illustrating the weight of the tractor and the constitution of a front grille according to the embodiment of the present invention.

As illustrated in FIG. 12, the front grille 8 covers a supply port through which the cooling air is taken out for the engine 3 and the like from the outside into the engine room. The front grille 8 is provided at an opening portion, which is a supply port formed in the front end portion of the hood 7. The front grille 8 is is constituted of resin or metal. A plurality of long holes 8a for which the longitudinal direction is the right-left direction are formed in the front grille 8.

With the constitution in the aforementioned manner, a proportion of areas of the holes of the front grille 8 per unit area increases, compared with the case where a plurality of round holes are formed. Accordingly, the tractor 1 can decrease resistance in the case where outside air passes through the front grille 8, compared with the case where the plurality of round holes are formed.

As illustrated in FIG. 9, the side covers 9 cover sections between the hood 7 on both right and left sides and the machine body frame 2. The side cover 9 is constituted of an upper side cover 9a and a lower side cover 9b. The upper side cover 9a is constituted of a reticular member and provided in such a manner as to cover a section ranging from the front wheels 4 to the cabin 26, on the lower side of the left surface 7d and the right surface 7e of the hood 7. The lower side cover 9b is provided in such a manner as to cover the machine body frame 2 on the lower side of the respective upper side covers 9a of the left surface 7d and the right surface 7e. The upper side cover 9a and the lower side cover 9b are fixed on the machine body frame 2.

With the constitution in the aforementioned manner, regarding the tractor 1, various apparatuses with regard to the engine 3 or the like that is not covered with the hood 7, and the machine body frame 2 are covered with the side cover 9 from the outside. Accordingly, the tractor 1 can prevent dirt raised by the front wheels 4 during travelling from intruding into the machine body frame 2 or the interior of the engine room by means of the side covers 9 while releasing heat in the engine room from the upper side covers 9a to the outside. In addition, the tractor 1 can release the heat in the engine room from the upper side covers 9a to the outside or take in fresh air of the outside into the engine room.

Next, the head lights 10 will be described referring to FIGS. 1, 3 to 5, 7, and 13 to 15.

As illustrated in FIGS. 1, 3 to 5, and 7, the head lights 10 light up in front of the tractor 1. The head lights 10 are provided on the left-side end and the right-side end of the front end portion of the hood 7. Specifically, the head lights 10 on both right and left sides are provided in the notch portions 7f and 7g that are constituted on the right side and left side of the front end portion of the hood 7. The head light 10 includes a case 11, a reflector 12, a bulb 13, an LED flasher 14, and a head light cover 15. The head lights are configured to light up with side-marker lights 19 described later. That is, the tractor 1 is configured such that the head lights 10 light up after the side-marker lights 19 light up.

Figure 13:
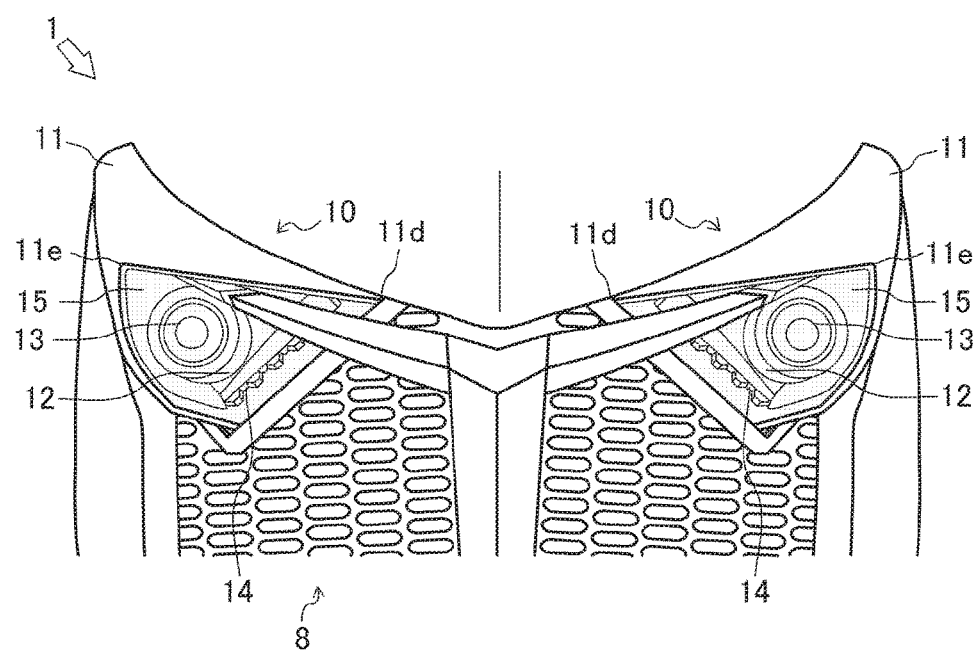
FIG. 13 is a partial enlarged front view illustrating the constitution of head lights according to an embodiment of the present invention.
Figure 14:
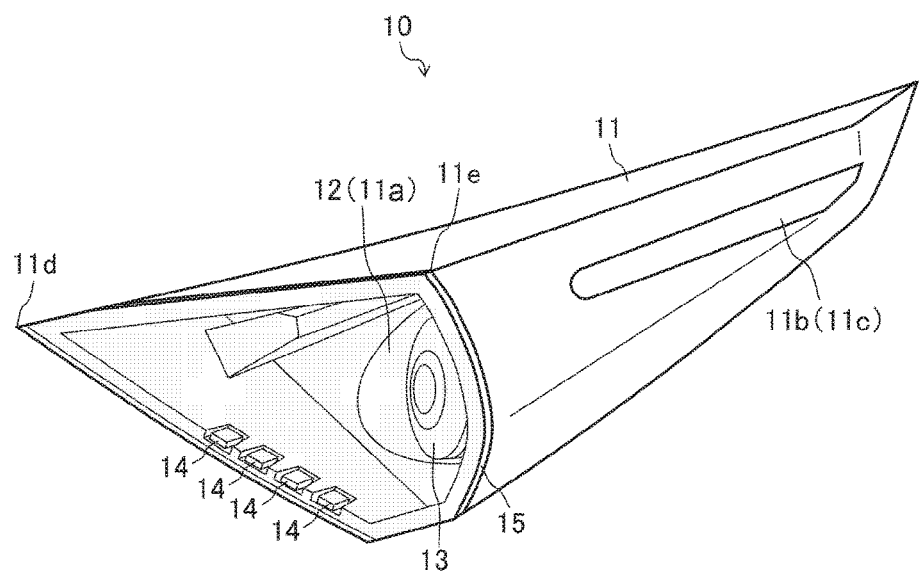
FIG. 14 is a partial enlarged side view illustrating the constitution of the head lights according to the embodiment of the present invention.
Figure 15:
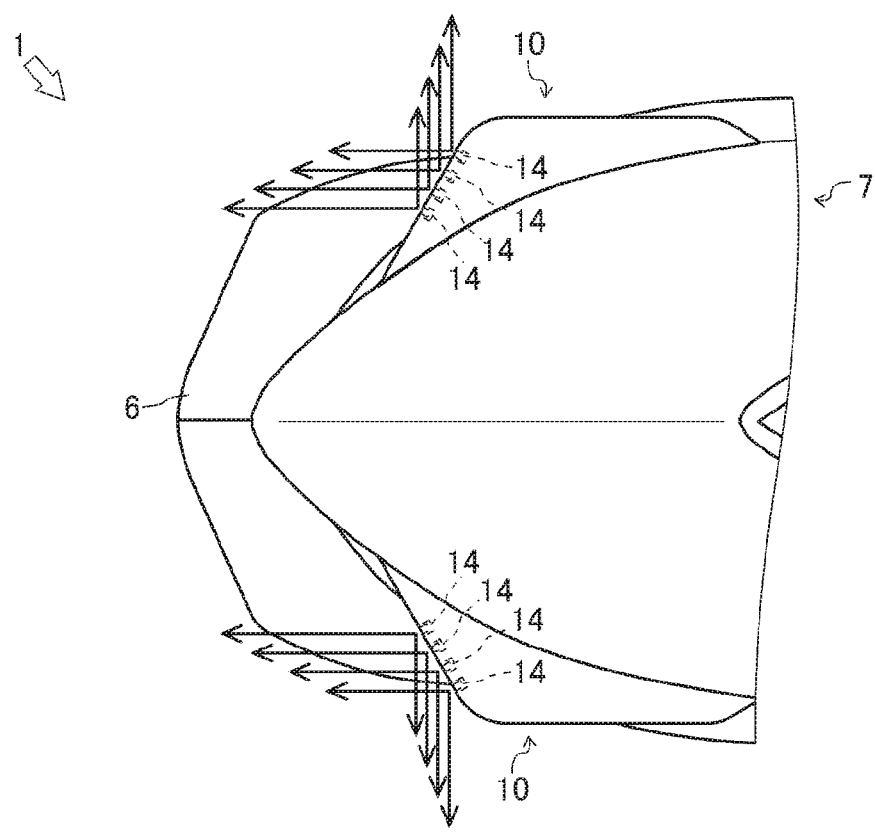
FIG. 15 is a partial enlarged top view illustrating the irradiation direction of the LED flash of the head lights according to the embodiment of the present invention.
Figure 16:
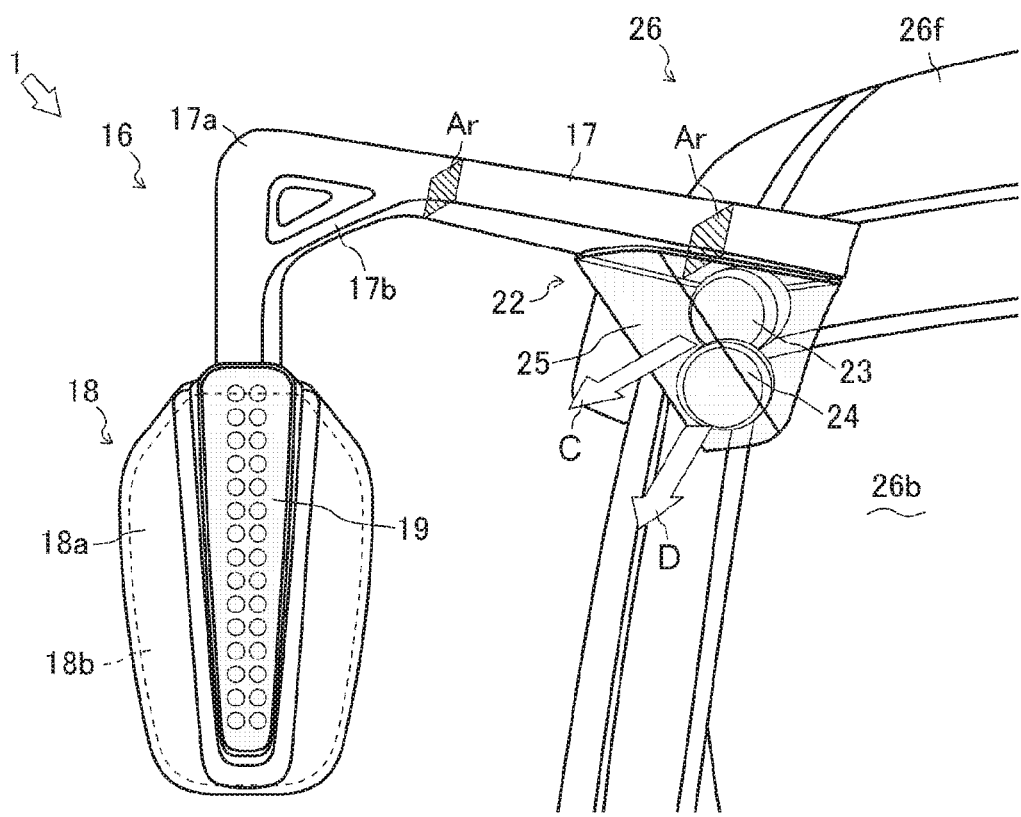
FIG. 16 is a partial enlarged front view illustrating the constitution of side view mirrors, front working lights, and side-marker lights according to an embodiment of the present invention.

As illustrated in FIGS. 13 to 15, the case 11 is a main constituent member of the head light 10, wherein the reflector 12, the bulb 13, the LED flasher 14, and the head light cover 15 are mounted. The case 11 is formed in an approximately triangular pyramid, which is mountable on the notch portions 7f and 7g of the hood 7 respectively. Also, the case 11 is formed in such a manner that the end surface on the large-diameter side, which is a base of the approximately triangular pyramid, is opened. That is, a concave portion 11a for mounting the reflector 12, the bulb 13, or the like is formed in the case 11 while the end surface on the large-diameter side is regarded as the front end surface of the case 11.

The cases 11 on the right and left are such that the concave portions 11a formed on the front end surface are respectively directed to the front of the tractor 1 and assembled into the notch portions 7f and 7g. In this time, the cases 11 on the right and left are arranged such that, out of three vertices of the front end surface, which is the base of the approximately triangular pyramid, a first vertex 11d is directed to the center in the right-left direction of the hood 7, and a second vertex 11e is directed to an outer side in the right-left direction of the hood 7. Also, the cases 11 on the right and left are assembled into the hood 7 in such a manner that an interval between the left-side surface of the case 11 on the left side and the right-side surface of the case 11 on the right side is approximately the same with the maximum width in the right-left direction of the hood 7.

The cases 11 on the right and left are configured in such a manner that the vertex (the first vertex 11d) on the central side in the right-left direction of the hood 7 on the front end surface protrudes to the front end of the hood 7, with respect to the vertex (the second vertex 11e) on the outer side in the right-left direction of the hood 7. That is, the front end surfaces of the cases 11 on the right and left are formed in such a manner as to protrude to the front as they advance from the outer side in the right-left direction of the hood 7 to the central side in the right-left direction of the hood 7 when viewed from a plane. That is, the case 11 on the left side is formed in a shape that the front end surface thereof can be visually recognized form the left of the tractor 1, and the case 11 on the right side is formed in a shape that the front end surface thereof can be visually recognized from the right of the tractor 1.

Reflectors 11b that condense light on the outside and reflect the light are provided on the left-side surface of the case 11 on the left side and on the right-side surface of the case 11 on the right side. It is noted that a slit 11c through which the light from the bulb 13 penetrates may be formed in the cases 11, in place of the reflector 11b.

The reflector 12 reflects the light of the bulb 13 as a reflection means. The reflector 12 is formed in an approximately dome shape in which the light of the bulb 13 arranged approximately in its center is reflected in a constant direction. The reflectors 12 are respectively assembled in the concave portions 11a of the cases 11 on the right and left in such a manner that the light is reflected to the front of the tractor 1. Specifically, the reflectors 12 are constituted in an approximately dome shape on the outer sides in the right-left direction of the hood 7 of the cases 11 and constituted leading from a portion constituted in an approximately dome shape to the end portion on the central side in the right-left direction of the hood 7 with regard to the cases 11.

The bulb 13 generates light as a main light source body. The bulb 13 is constituted of light sources of arbitrary types such halogen lamps and HID lamps. The bulb 13 is assembled in a predetermined position approximately in the center of the reflector 12 constituted in an approximately dome shape. Accordingly, the greater part of the light generated from bulb 13 is irradiated to the front of the tractor 1 by the reflectors 12. In contrast, part of the light generated from bulb 13 is irradiated in the right-left direction of the tractor 1 by the reflectors 12 provided in or before reaching the end portion on the central side in the right-left direction of the hood 7 of the case 11.

The LED flasher 14 generates light as an auxiliary light source body. The LED flasher 14 is constituted of a plurality of LEDs. The LED flasher 14 is provided in such a manner that respective LEDs are arranged side by side in a row on the front end surfaces of the cases 11 on the right and left. That is, the LED flasher 14 is such that the LEDs are arranged facing the center in the right-left direction of the front end from the outer sides in the right-left direction of the hood 7. Accordingly, the LED flasher 14 can be visually recognized not only from the front of the tractor 1 but also from the right and left (see FIG. 15). The LED flashers 14 are constituted in such a manner as to light up in combination with the side-marker lights 19 described later when the side-marker lights 19 light up. It is noted that, in the present embodiment, the LED flasher 14 is constituted of the plurality of LEDs, but may be constituted of other light sources.

The head light cover 15 protects the reflector 12, the bulb 13, and the LED flasher 14 in the case 11. The head light cover 15 is constituted of materials through which the light of the bulb 13 and the LED flasher 14 penetrate. The head light covers 15 are respectively provided on the front end surfaces of the cases 11 on the right and left in such a manner as to cover the reflector 12, which is arranged in the concave portion 11a of the case 11, the bulb 13, and the LED flasher 14 (see hatching sections in FIGS. 13 and 14).

With this constitution in the aforementioned manner, the tractor 1 irradiates the light to the front, the right, and the left by means of the reflection of light from the bulbs 13 by the reflectors 12, the reflection of light on the outside by the reflectors 11b of the cases 11 or the transmissive light from the slits 11c of the bulbs 13, and the LED flasher 14 provided on the front end surface of the cases 11 while irradiating the light in the advancing direction by the bulbs 13, which are the main light source bodies of the head lights 10 on the right and left. Also, the reflection of the light of the bulbs 13 by the reflectors 12 from the front end surfaces of the head lights 10, which are visually recognizable from the lateral directions of the tractor 1, is not blocked by the hood 7 thanks to the notch portions 7f and 7g formed in the hood 7. Accordingly, visibility from the front, the right, and the left of the tractor 1 can be improved.

Next, side view mirrors 16 and front working lights 22 will be described referring to FIGS. 1, 3, 4, 7, 8, and 16 to 19.

As illustrated in FIGS. 1, 3, 4, 7, 8, and 16, the side view mirrors 16 are used to visually recognize the rear of the tractor 1. The right and left side view mirrors 16 are respectively provided on the bilateral ends of the upper portion of the front side surface 26b of the cabin 26. The side view mirror 16 includes a support arm 17, the front working light 22, a mirror portion 18, and the side-marker light 19.

The right and left support arms 17 support the mirror portions 18 and the side-marker lights 19. The support arm 17 is constituted of a rectangular bar-shaped member when viewed from a cross section vertical to the axial direction thereof. The support arm 17 is formed in an approximately L shape having a bending portion 17a in the midway portion. The lateral ends of the long side portions of the support arms 17 are respectively fixed on the bilateral ends of the upper portions of the front side surface 26b of the cabin 26.

The support arm 17 is formed in such a manner that a cross-sectional area Ar of the rectangular cross section is reduced when viewed from a cross section vertical to the axial direction thereof, as it advances from one lateral end to the lateral end (other lateral end) of the short side portion, on which the mirror portion 18 is supported. That is, the support arm 17 is configured in such a manner that weight per unit length is reduced as it advances from one lateral end fixed to the cabin 26 to the other lateral end. Furthermore, the support arm 17 is integrally formed with a beam 17b that couples one end and the other end in such a manner as to straddle over the bending portion 17a. Accordingly, regarding the support arm 17, while the rigidity of one lateral end portion and the rigidity of the bending portion 17a are secured, the weight of the other lateral end portion is reduced, so that the vibration of the other lateral end is suppressed.

The left support arm 17 is provided in such a manner that the long side portion thereof faces from the front side surface 26b to the left-side front. The left support arm 17 is provided in such a manner that the long side portion thereof faces from the front side surface 26b to the right-side front. Also, the support arms 17 on both right and left sides are provided in such a manner that the short side portions thereof face downward from the bending portion 17a. Specifically, the support arms 17 are constituted such that a position in the back-forth direction of the bending portion 17a is placed in the vicinity of the rear end of the hood 7 (see FIGS. 3 and 4), and a position in the right-left direction of the bending portion 17a is placed in an approximate center of the width of the rear wheels 5 (see FIG. 5), and a position of height of the bending portion 17a is placed in the vicinity of a ceiling 26f of the cabin 26 (see FIGS. 3 and 4). That is, the support arms 17 are constituted such that the mirror portions 18 are arranged at position separated from the cabin 26 (drive operating unit 37) to the front on both right and left sides.

The mirror portions 18 hold mirrors. Regarding the mirror portions 18, a mirror 18b is provided in the interior of a box-shaped case 18a having an opening portion. The mirror portions 18 are constituted such that the mirror 18b is provided in the opening portion of the case 18a, and the reflection surface of the mirror 18b can be visually recognized from the outside. The mirror portions 18 are connected to the short-side lateral end of the support arm 17 while the reflection surface of the mirror 18b faces the rear of the tractor 1. That is, the mirror portions 18 are arranged at position indicating the approximate width and height of the tractor 1. The mirror portions 18 are constituted such that the reflection surface of the mirror 18b can face in an arbitrary direction with respect to the support arm 17.

The side-marker light 19 are used to visually recognize the width of the tractor 1. The side-marker light 19 are constituted of a plurality of LEDs. The side-marker light 19 are respectively provided in the cases 18a of right and left mirror portions 18 and on the surface (back surface) opposite to the opening portion. That is, the side-marker lights 19 are configured to light up to the front of the tractor 1 on the opposite side respect to the reflection surface of the mirrors 18b of the mirror portions 18 facing the rear of the tractor 1. The side-marker light 19 are provided at the mirror portions 18 on both right and left sides, so that the approximate width and height of the tractor 1 can be indicated. Also, the side-marker lights 19 can be used as a direction indicator by blinking one of right and left side-marker lights 19.

With this constitution in the aforementioned manner, regarding the tractor 1, the mirror portions 18 are arranged at positions of being disposed in front of the cabin 26 on both right and left sides and separated above the cabin 26. Accordingly, the tractor 1 can simultaneously represent the width and height of the tractor 1 while securing the field of vision in the rear.

Figure 18A:
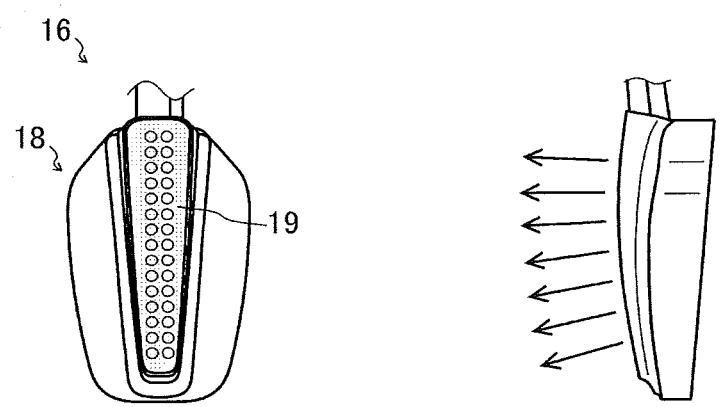
FIG. 18A is a partial enlarged view illustrating the irradiation direction of the side-marker lights according to a first embodiment of the present invention.

The side-marker lights 19 are such that the plurality of LEDs are arranged in an arbitrary mode in the mirror portions 18. Specifically, the side-marker lights 19, which are the first embodiment of the side-marker light, are constituted such that the plurality of LEDs are arranged side by side in the up-down direction on the rear surfaces of the cases 18a of the mirror portions 18. Then, as illustrated in FIG. 18A, the side-marker lights 19 are formed in a spherical-surface shape smoothly expanded to the front of the tractor 1 on the rear surfaces of the cases 18a, so that the irradiation direction of each LED can be diffused in the up-down direction.

Figure 17:
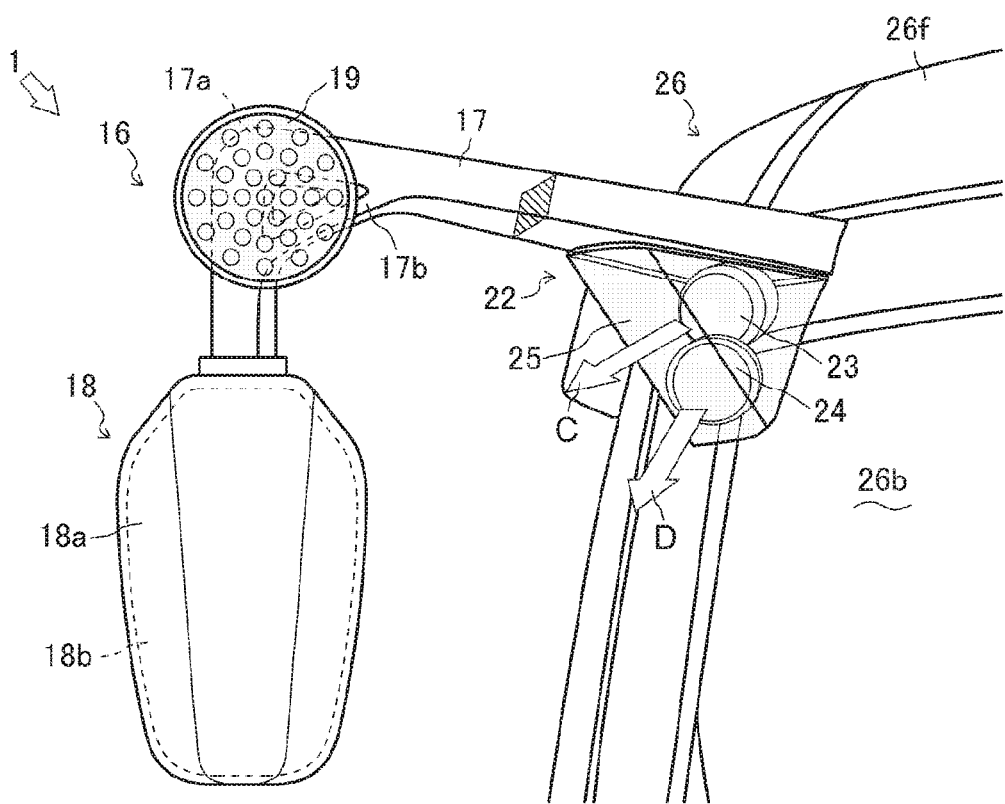
FIG. 17 is a partial enlarged front view illustrating the constitution of the side view mirrors, the front working lights, and the side-marker lights according to another embodiment of the present invention.

Also, as illustrated in FIG. 17, as another embodiment of the side-marker light 19, the side-marker light 19 may be provided in the vicinity of the bending portion 17a of the support arm 17. Specifically, the side-marker light 19 is mounted by use of a surface that is constituted of the bending portion 17a and beam 17b of the support arm 17.

With this constitution in the aforementioned manner, regarding the tractor 1, the side-marker light 19 always lights up in a constant direction and at a constant position irrespective of the direction of the mirror portions 18. Accordingly, the tractor 1 can simultaneously represent the width and height while securing the field of vision in the rear.

Figure 18B:
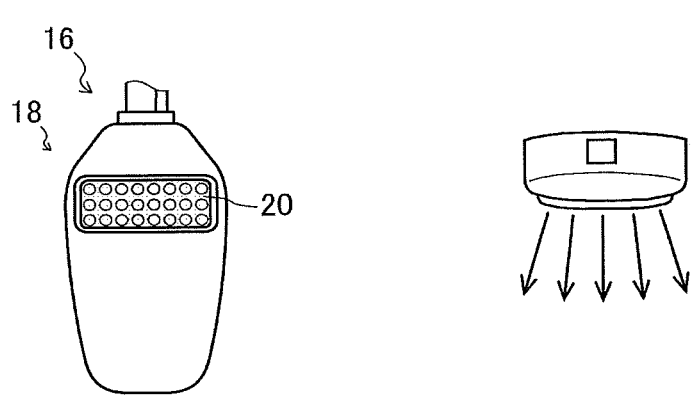
FIG. 18B is a partial enlarged view illustrating the irradiation direction of the side-marker lights according to a second embodiment of the present invention.

Also, as illustrated in FIG. 18B, side-marker lights 20, which are the second embodiment of the side-marker light, are constituted such that the plurality of LEDs are arranged side by side in the right-left direction on the rear surfaces of the cases 18a of the mirror portions 18. Then, the side-marker lights 20 are formed in a spherical-surface shape smoothly expanded to the front of the tractor 1 on the rear surfaces of the cases 18a, so that the irradiation direction of each LED can be diffused in the right-left direction.

Figure 18C:
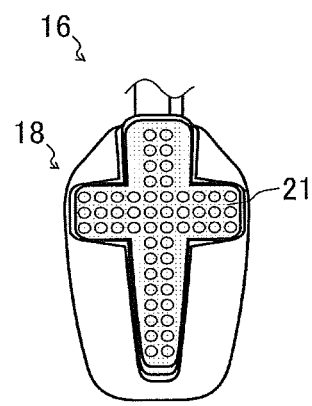
FIG. 18C is a partial enlarged view illustrating the side-marker lights according to a third embodiment of the present invention.
Figure 19:
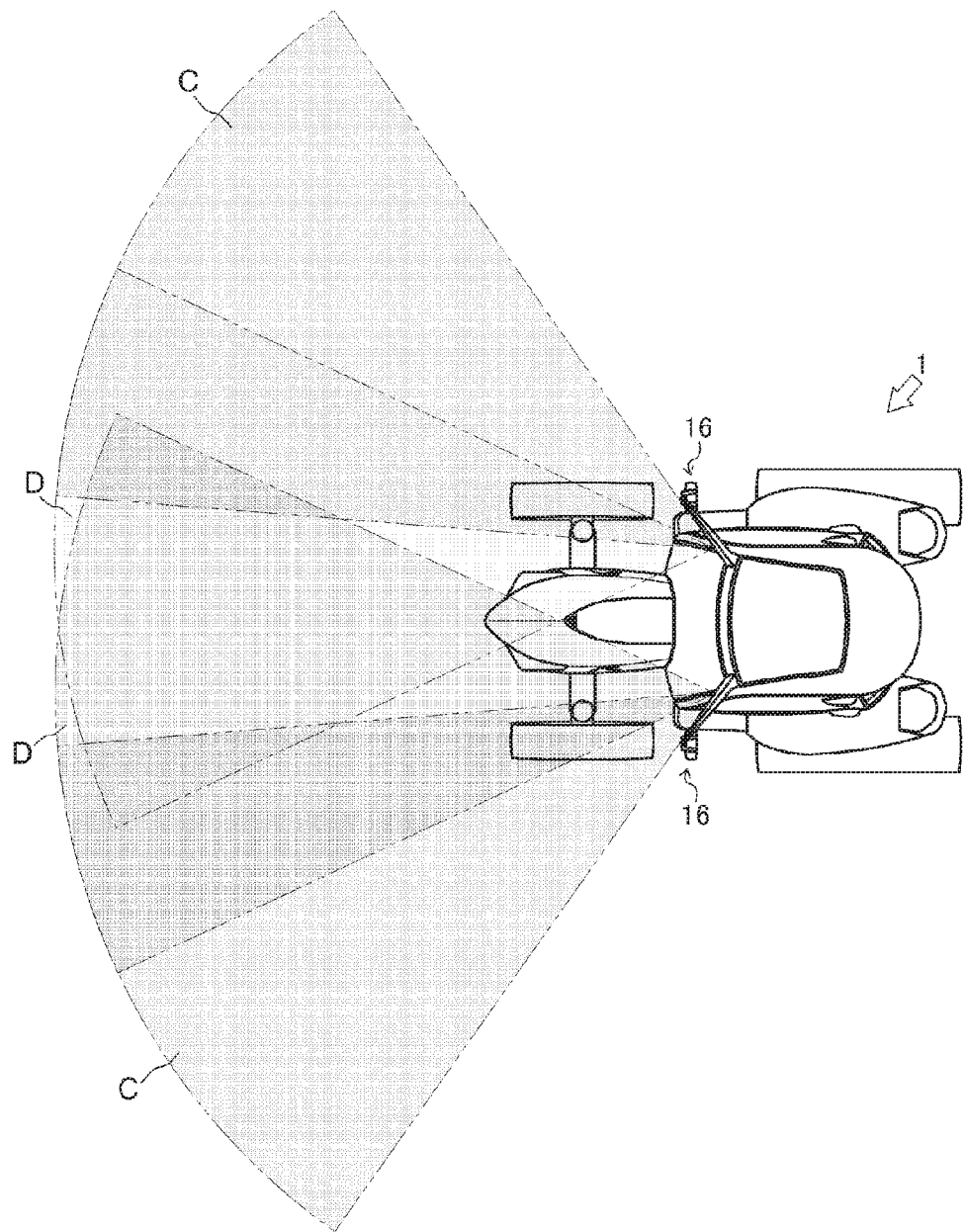
FIG. 19 is a view illustrating ranges in which the front working lights of the tractor according to the embodiment of the present invention irradiate.
Figure 20:
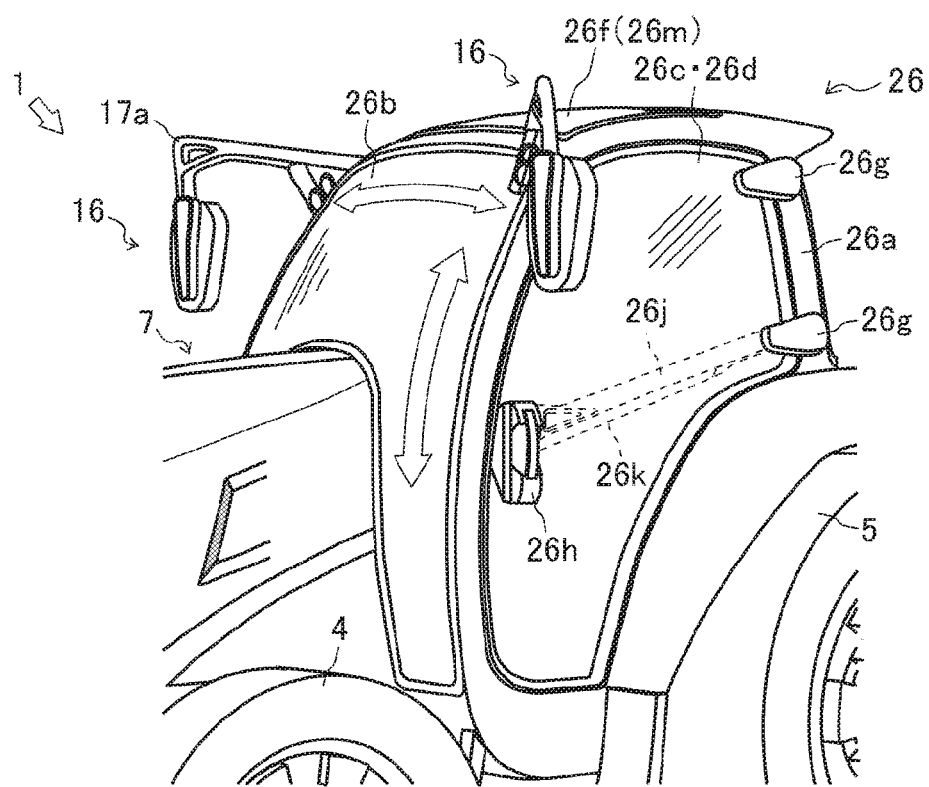
FIG. 20 is a partial enlarged perspective front view illustrating the constitution of a cabin of the tractor according to the embodiment of the present invention.

Also, as illustrated in FIG. 18C, side-marker lights 21, which are the third embodiment of the side-marker light, are constituted such that the plurality of LEDs are arranged side by side in the up-down direction and the right-left direction on the rear surfaces of the cases 18a of the mirror portions 18. The side-marker lights 21 are formed in a spherical-surface shape smoothly expanded to the front of the tractor 1 on the rear surfaces of the cases 18a, so that the irradiation direction of each LED can be diffused in the up-down direction and the right-left direction.

With this constitution in the aforementioned manner, regarding the tractor 1, the irradiation direction of the side-marker lights 19 are set based on the shape of the case 18a of the mirror portion 18 and the arrangement of the side-marker lights 19. Accordingly, the tractor 1 can simultaneously represent the width and height while securing the field of vision in the rear.

As illustrated in FIGS. 1, 3, 4, 7, 16 and 19, the front working lights 22 light up in front of the tractor 1. The front working lights 22 are respectively provided on one side end portion (the lateral end portion of the long-side portion) of the right and left support arms 17. The front working light 22 includes an upper working light 23, a lower working light 24, and a front working light cover 25.

Regarding the front working light 22, the upper working light 23 and the lower working light 24 are arranged side by side in the up-down direction on the lower side of the one side end portion of the support arm 17. The front working light cover 25 is formed of a material through which the light from the upper working light 23 and the lower working light 24 penetrates. The front working light cover 25 is constituted in such a manner as to cover the upper working light 23 and the lower working light 24 and couple the lower side surface of the support arm 17 with the front side surface 26b of the cabin 26 (see a hatching section in FIG. 16). That is, the front working light cover 25 protects the upper working light 23 and the lower working light 24 and improves the rigidity of the support arm 17. Accordingly, regarding the support arm 17, the rigidity of the one side end portion is further improved, thereby suppressing vibration.

The front working light 22 is constituted such that the upper working light 23 and the lower working light 24 respectively illuminate an arbitrary range. For example, as illustrated in a white-painted arrow in FIG. 16 and FIG. 19, the right and left front working lights 22 are constituted in such a manner that the upper working lights 23 illuminate irradiation ranges C respectively, which are the left-side front and the right-side front of the tractor 1 and that the right and left lower working lights 24 illuminate an irradiation range D, which is the front of the tractor 1. Also, the right and left front working lights 22 may be constituted in such a manner that the upper working lights 23 illuminate the irradiation range D, which is the front of the tractor 1 and that the right and left lower working lights 24 illuminate the irradiation ranges C, which are the left-side front and the right-side front of the tractor 1.

With this constitution in the aforementioned manner, regarding the tractor 1, the irradiation ranges of the front working lights 22 are set in such a manner as not to include the side view mirrors 16 in the irradiation ranges. Also, regarding the tractor 1, the support arms 17 of the side view mirrors 16 is reinforced by the front working lights 22. Accordingly, the tractor 1 can improve the visual recognizability of the side-marker lights 19 while irradiating light in a wide range by means of the front working lights.

Next, the cabin 26 and rear working lights 28 will be described referring to FIGS. 1, 2, and 20 to 23.

As illustrated in FIGS. 1, 2, 20, and 21, the cabin 26 covers the drive operating unit 37. The cabin 26 is constituted in an approximately box shape formed by the front side surface 26b, a left side door 26c, a right side door 26d, a rear side surface 26e, and the ceiling 26f with a cabin frame 26a. An air-conditioner unit 27 and rear working lights 28 are included in the cabin 26.

Regarding the cabin 26, a frame body of the left side door 26c and the frame body of the right side door 26d, which are integrally formed, are fixed on the machine body frame 2, thereby constituting the frame 26a. That is, regarding the cabin 26, the frame bodies on both right and left sides of the front side surface 26b, the frame bodies on both right and left sides of the rear side surface 26e, and the frame bodies on both right and left sides of the ceiling 26f are integrally constituted as the frame body of the left side door 26c and the frame body of the right side door 26d respectively. Accordingly, regarding the cabin 26, the front side surface 26b, the rear side surface 26e, and the ceiling 26f are integrally constituted.

The front side surface 26b of the cabin 26 is constituted in front of the drive operating unit 37 via the cabin frame 26a. Curved surface glass (or resin, specifically, polycarbonate, acryl, or the like) that cover a section from the floor surface of the drive operating unit 37 to the ceiling 26f of the cabin 26 is provided as a windshield on the front side surface 26b. The curved surface glass constituting the front side surface 26b is formed in such a manner as to bend in a smooth arc shape in the right-left direction as the axial direction and in a smooth arc shape in the up-down direction as the axial direction (see a white-painted arrow in FIG. 20). That is, the front side surface 26b is constituted of the curved surface glass formed in an approximately spherical-surface shape expanded in the front direction. A notch portion for arranging the instrumental panel 38 in the central portion in the right-left direction is formed on the curved surface glass of the front side surface 26b.

The left side door 26c and the right side door 26d, which can open and close the entire surface of the cabin 26, are respectively provided with the cabin frame 26a as the frame body on both right and left lateral surfaces of the cabin 26. The entire surfaces of the left side door 26c and the right side door 26d are constituted of the curved surface glass (or resin, specifically, polycarbonate, acryl, or the like) bent in a smooth arc shape in the up-down direction as the axial direction (see the white-painted arrow in FIG. 20). The rear end portions of the left side door 26c and the right side door 26d are connected to the cabin frame 26a via hinges 26g.

External handles 26h are provided on the front end portions of the left side door 26c and the right side door 26d. Reinforcing bars 26j are provided on the left side door 26c and the right side door 26d. The reinforcing bars 26j are constituted of a plate-shaped member. The reinforcing bar 26j couples the hinge 26g with the external handle 26h on the side of the drive operating unit 37 in the up-down direction as a plate-width direction. Inner-side handles 26k that are used in opening and closing the left side door 26c and the right side door 26d are formed on the reinforcing bars 26j. It is formed such that the inner-side handle 26k branches in such a manner as to protrude from the midway portion on the side of the hinge 26g of the reinforcing bar 26j to the side of the drive operating unit 37 (operating seat 42). The inner-side handle 26k is formed until the inner-side handle 26k leads to the external handle 26h in parallel with the reinforcing bar 26j (see FIG. 28).

The rear side surface 26e of the cabin 26 is constituted in back of the drive operating unit 37 via the cabin frame 26a. The curved surface glass (or resin, specifically, polycarbonate, acryl, or the like) that covers a section from the vicinity of the seating surface of the operating seat 42 of the drive operating unit 37 to the ceiling 26f of the cabin 26 is provided as rear glass on the rear side surface 26e. The curved surface glass constituting the rear side surface 26e is formed in such a manner that the both right and left end portions thereof are bent, so as to continuously connect the left side door 26c and the right side door 26d.

The ceiling 26f of the cabin 26 is constituted on the upper end portions of the front side surface 26b, the left side door 26c, the right side door 26d, and the rear side surface 26e via the cabin frame 26a. Curved surface glass 26m (or resin, specifically, polycarbonate, acryl, or the like) that covers a section from the front end of the ceiling 26f to a position corresponding to the upper section of the operating seat 42 of the drive operating unit 37 is provided on the ceiling 26f. The curved surface glass 26m constituting the ceiling 26f is bent and formed in such a manner as to continuously connect the front side surface 26b. With this constitution in the aforementioned manner, the forward field of vision is secured, which makes it easy to visually recognize a work machine hoisted in loading work and the like and improves workability.

The ceiling 26f is formed in a curved shape from the front end to the rear end thereof as a whole. The radius of curvature of the curved shape of the ceiling 26f increases as the ceiling 26f advances to the rear end in such a manner that the radius of curvature is varied from a radius R1 of curvature in the vicinity of the front end of the ceiling 26f to a radius R2 of curvature in the vicinity of the rear end of the ceiling 26f. That is, the ceiling 26f is constituted in an arc shape that approximates a clothoid curve represented by the following mathematical expression with a radius R of curvature and a length L of a curved line.

$$RL = A^2 \quad (A: \text{Clothoid Parameter}) \qquad \text{Mathematical Expression:}$$

Accordingly, the ceiling 26f can be constituted in such a manner that the height from the ground gently increases as the ceiling 26f advances to the rear end thereof. That is, it is constituted such that the thickness of the ceiling 26f increases in such a manner as to change from a thickness H1 in the vicinity of the front end of the ceiling 26f to a thickness H2 in the vicinity of the rear end of the ceiling 26f as the ceiling 26f advances to the rear end (see FIG. 21). Furthermore, an eaves portion 26n, wherein only the upper end of the rear end surface of the ceiling 26f protrudes to the rear with respect to the rear side surface 26e of the cabin 26, is formed on the ceiling 26f.

Figure 22:
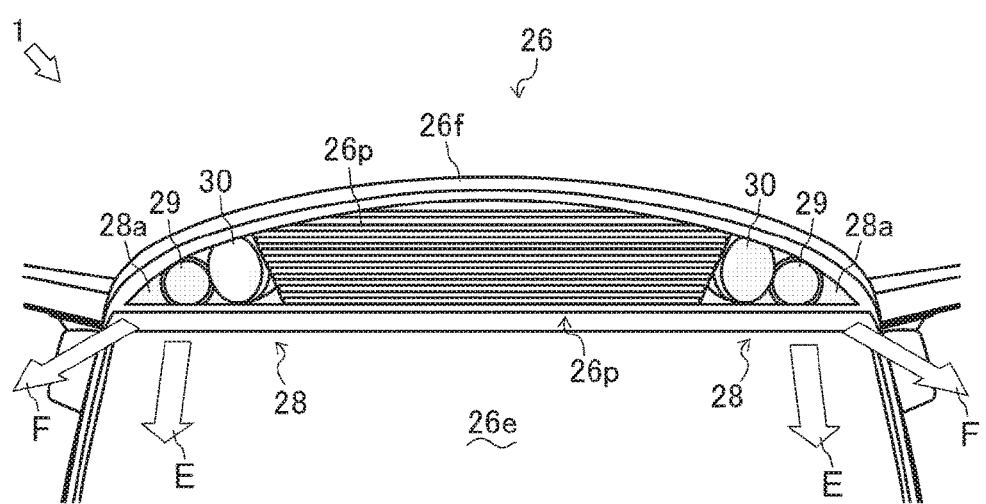
FIG. 22 is a partial enlarged rear view illustrating the constitution of the cabin of the tractor according to the embodiment of the present invention.

The air-conditioner unit 27 is provided in the interior of the ceiling 26f, ranging from the rear end of the curved surface glass 26m to the rear end of the ceiling 26f. As illustrated in FIG. 22, an introducing port 26p, through which the air-conditioner unit 27 takes in outside air, is provided in the eaves portion 26n of the rear end of the ceiling 26f. A louver is provided in the introducing port 26p. Accordingly, the tractor 1 can include the air-conditioner unit 27 in the interior of the ceiling 26f without causing part of the ceiling 26f to protrude or forming the introducing port separately.

With this constitution in the aforementioned manner, the tractor 1 is constituted of the curved surface glass or resin except for the cabin frame 26a and the rear portion of the ceiling 26f. Also, regarding the tractor 1, the visibility and rigidity of the cabin 26 are improved with monocoque structure in which the frame 26a integrally formed is successively coupled with the curved surface glass. Regarding the tractor 1, the opening and closing of the left side door 26c and the right side door 26d are facilitated, and the left side door 26c and the right side door 26d are reinforced with the reinforcing bars 26j. Accordingly, regarding the tractor 1, the front side surface 26b, the left side door 26c, the right side door 26d, the rear side surface 26e, and the ceiling 26f of the cabin 26 can be constituted of glass.

Also, regarding the tractor 1, the thickness of the ceiling 26f of the cabin 26 successively increases from the ceiling 26f of the cabin 26 to the rear end. Accordingly, the air-conditioner unit can be provided in the interior of the ceiling 26f without causing part of the ceiling 26f to protrude or separately forming the introducing port, through which the air-conditioner unit 27 takes in the outside air.

Figure 21:
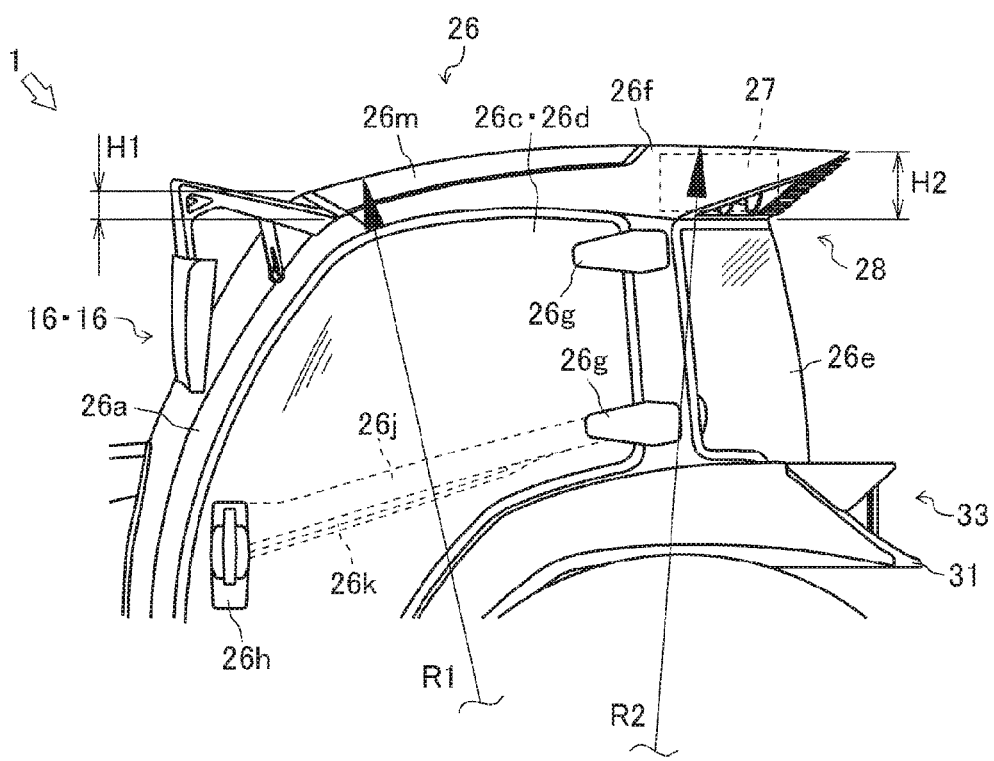
FIG. 21 is a partial enlarged side view illustrating the constitution of the cabin of the tractor according to the embodiment of the present invention.

As illustrated in FIGS. 2, 21, and 22, the rear working lights 28 illuminate the rear of the tractor 1. The right and left rear working lights 28 are respectively provided both side end portions of the inclined surface of the rear end of the ceiling 26f. The introducing port 26p of the air-conditioner unit 27 is formed between the right and left rear working lights 28. The rear working light 28 includes an external working light 29 and an internal working light 30.

Figure 23:
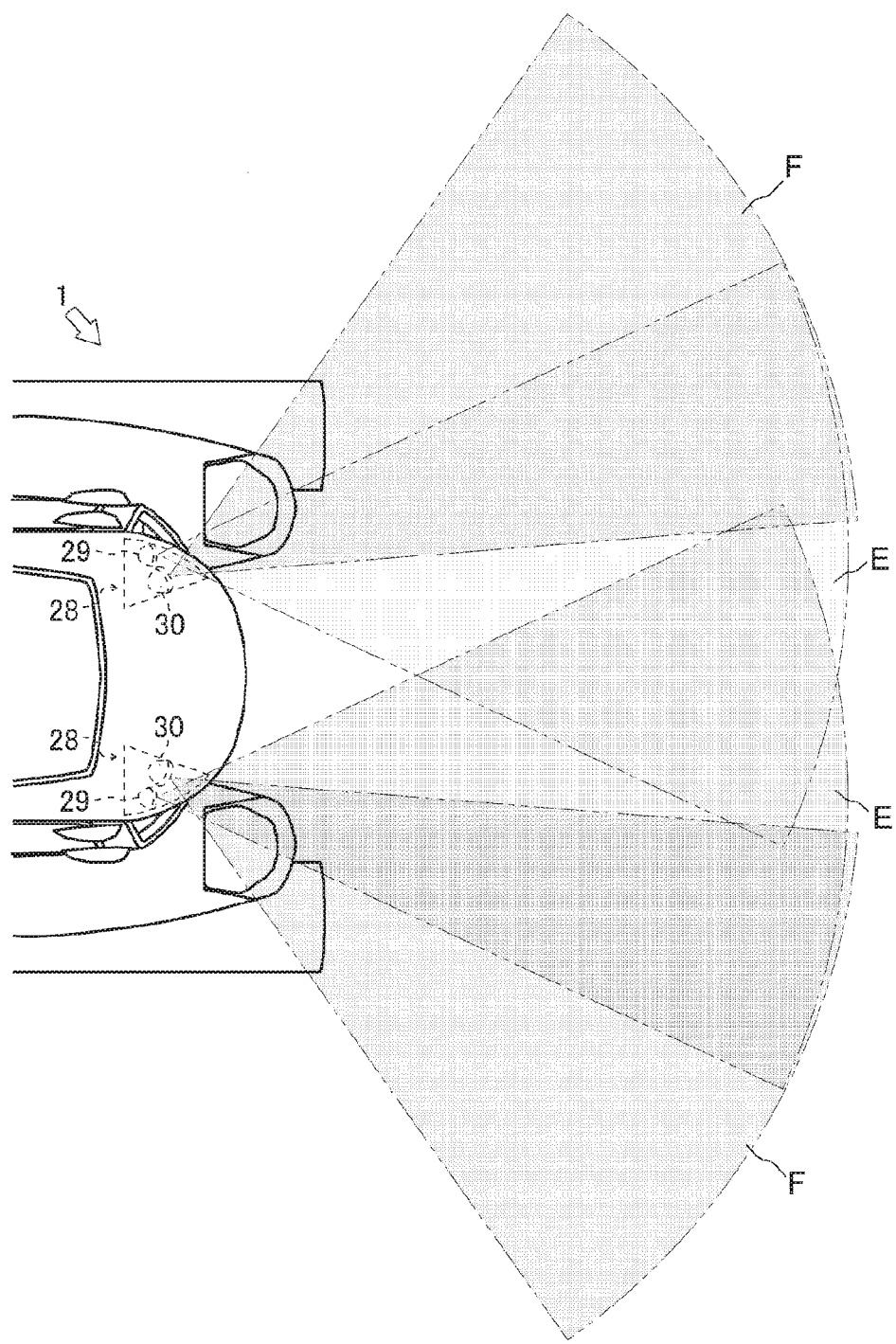
FIG. 23 is a view illustrating ranges in which the rear working lights of the tractor according to the embodiment of the present invention irradiate.
Figure 24:
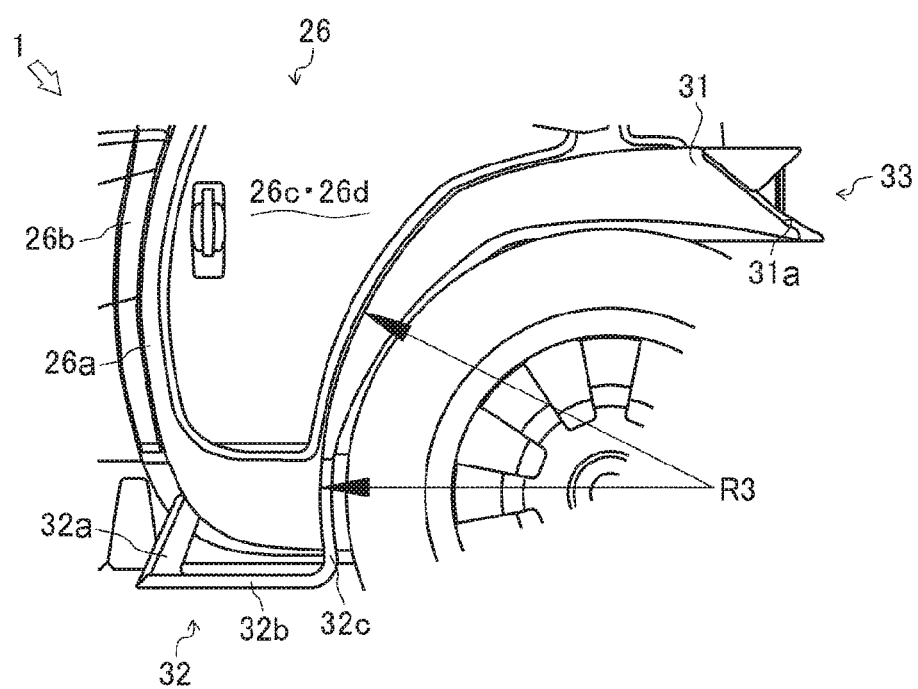
FIG. 24 is a partial enlarged side view illustrating the constitution of a fender and a step of the tractor according to the embodiment of the present invention.
Figure 25:
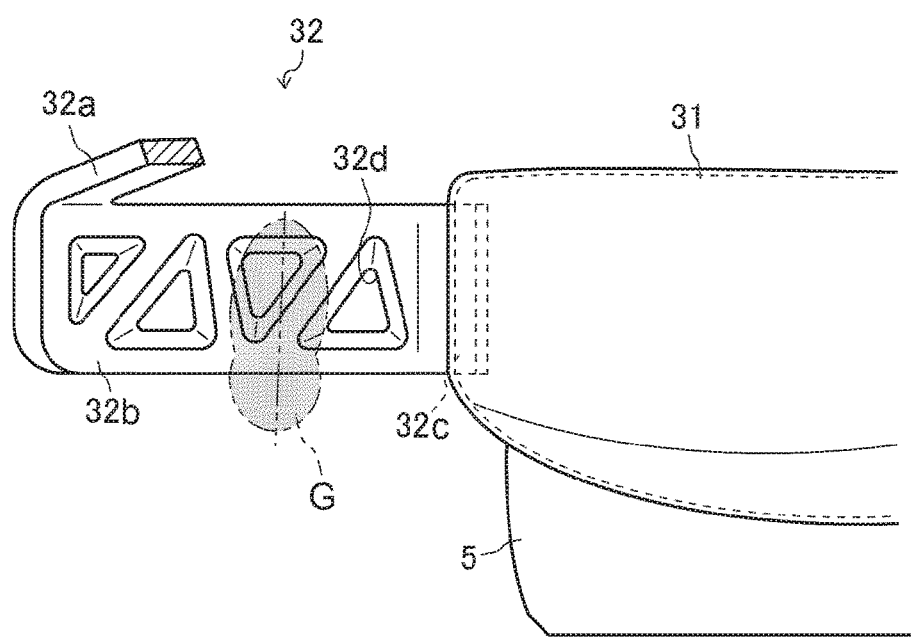
FIG. 25 is a partial enlarged top view illustrating the constitution of the step the tractor according to the embodiment of the present invention.

As illustrated in FIGS. 22 and 23, regarding the rear working light 28, the external working light 29 and the internal working light 30 are arranged side by side in the right-left direction in the eaves portion 26n of the rear end of the ceiling 26f. The rear working lights 28 are covered with rear working light covers 28a (see a hatching portion in FIG. 22) formed of a material through which the light from the external working light 29 and the internal working light 30 penetrate. The external working light 29 and the internal working light 30 are provided in such a manner as to face the rear via the eaves portion 26n from the interior of the ceiling 26f, so as not to protrude with respect to the eaves portion 26n. Accordingly, regarding the rear working lights 28, the rear working light covers 28a are provided in such a manner as to be flush with the eaves portion 26n.

The rear working lights 28 are constituted such that the external working light 29 and the internal working light 30 respectively illuminate an arbitrary range. For example, the rear working lights 28 are constituted such that the right and left external working lights 29 illuminate the rears E of the tractor 1, and the right and left internal working lights 30 illuminate the right and left rears F of the tractor 1 respectively (see white-painted arrows in FIG. 22). Also, the rear working lights 28 may be constituted such that the right and left external working lights 29 illuminate the right and left rears F of the tractor 1, and the right and left internal working lights 30 illuminate the rears E of the tractor 1.

With this constitution in the aforementioned manner, regarding the tractor 1, the rear working lights 28 (the external working lights 29 and the internal working lights 30) are provided in such a manner as to face the rear from the interior of the ceiling 26f of the cabin 26, and the irradiation ranges of the external working lights 29 and the internal working lights 30 are set. Accordingly, a wide range can be irradiated by the rear working lights 28 without causing the rear working lights 28 to protrude from the cabin 26.

Next, fenders 31, steps 32, and combination lamps 33 will be described referring to FIGS. 1 to 4 and 24 to 27.

As illustrated in FIGS. 1 to 4, and 24, the fenders 31 prevent dirt raised by the rotation of the rear wheels 5 from scattering. The fenders 31 are provided on both right and left sides of the cabin 26 in such a manner as to cover the tread surfaces (surfaces in contact with the ground) of the rear wheels 5 on the both right and left sides. Specifically, the fenders 31 are provided along the tread surfaces of the rear wheels 5 from the vicinity of the rear side surface 26e of the cabin 26 to the vicinity of the machine body frame 2. Also, the fenders 31 are constituted in such a manner that the central side in the right-left direction of the tractor 1 is abutted to the operating seat 42 in the cabin 26. That is, the right and left fenders 31 are arranged in the tractor 1 in such a manner as to sandwich the operating seat 42. The fenders 31 are integrally formed on the outside and inside of the cabin 26.

The steps 32 are connected to the front ends (the side of the machine body frame 2) of the fenders 31. Inclined surfaces 31a that tilt downward are formed on the rear ends (the side of t rear side surface 26e of the cabin 26) of the fenders 31. Then, the combination lamps 33 are provided on the inclined surfaces 31a of the fenders 31.

As illustrated in FIGS. 1 to 4, 24, and 25, when an operator gets into the cabin 26, the step 32 is treaded by the leg G of the operator. The steps 32 are respectively provided in front of the rear wheels 5 and in the vicinity of the left side door 26c and the right side door 26d of the cabin 26. The step 32 is constituted of a front support portion 32a, a receiving portion 32b, and a rear support portion 32c.

The front support portion 32a supports the front of the receiving portion 32b. One end of the front support portion 32a is coupled with the cabin frame 26a in the vicinity of the floor of the drive operating unit 37. The other end of the front support portion 32a is formed in such a manner as to lead from the cabin frame 26a to the front with respect to the front side surface 26b of the cabin 26. Then, the other end of the front support portion 32a is coupled with the receiving portion 32b at a predetermined position of which the height is lower than that of the shaft of the rear wheels 5. That is, the front support portion 32a is formed in such a manner as to extend obliquely downward from the cabin frame 26a to the front. Also, the other end of the front support portion 32a is coupled with the lateral surface on the side of the tractor 1. That is, the front support portion 32a is coupled with the receiving portion 32b in such a manner that the front end of the receiving portion 32b is released.

The rear support portion 32c support the rear of the receiving portion 32b. The rear support portion 32c is coupled with the front end of the fender 31. The rear support portion 32c has approximately the same width as the width in the right-left direction on the outer side with respect to the cabin 26 of the front end of the fender 31 and is formed along the tread surface of the rear wheel 5 from the front end of the fender 31. Then, the rear support portion 32c is coupled with the receiving portion 32b at a predetermined position of which the height is lower than that of the shaft of the rear wheels 5. That is, the rear support portion 32c is formed in such a manner as to successively extend from the front end of the fender 31 to the rear with respect to the front end of the fender 31 while having the same radius R3 of curvature as that of the fender 31.

The receiving portion 32b is treaded by the leg G of the operator. The front and rear end portions of the receiving portion 32b are integrally coupled with the front support portion 32a and the rear support portion 32c. The receiving portion 32b is connected with the front support portion 32a forward with respect to the front side surface 26b of the cabin 26 and coupled with the fender 31 rearward with respect to the front end of the fender 31. Also, the receiving portion 32b is formed in the same width in the right-left direction as the width of the rear support portion 32c in the right-left direction. That is, the receiving portion 32b is formed with approximately the same width as the width in the right-left direction on the outer side with respect to the cabin 26 of the front end of the fender 31.

A plurality of triangular punch-out holes 32d are formed on the surface of the receiving portion 32b treaded by the leg G of the operator. The punch-out holes 32d are arranged in such a manner that each side is not in parallel to the right-left direction of the receiving portion 32b. Also, the punch-out holes 32d are formed in such a manner that the sides of the adjacent punch-out holes 32d are in parallel to each other. That is, a beam-shaped portion between the punch-out holes 32d of the receiving portion 32b is formed in the oblique direction with respect to the longitudinal direction of the leg G of the operator who gets on or off.

With this constitution in the aforementioned manner, regarding the tractor 1, the width of the receiving portion 32b of the step 32 is formed wider than the width of the right and left doors in the neighborhood of the floor of the cabin. Regarding the tractor 1, the front support portion 32a of the step 32 is coupled with the receiving portion 32b on the side of the tractor 1, so that the range, in which the leg G of the operator is laid, is not limited by the front support portion 32a. Also, regarding the tractor 1, the rear support portion 32c of the step 32 is successively formed with fender 31, so that the leg G of the operator does not contact the front end of the fender 31. Furthermore, the lateral direction of the leg G of the operator is supported by a crosspiece. Accordingly, the steps 32 can expand the surface of the receiving portion 32b treaded by the leg G of the operator and improve the stability of the leg G and convenience when the operator gets on or off.

Figure 8:
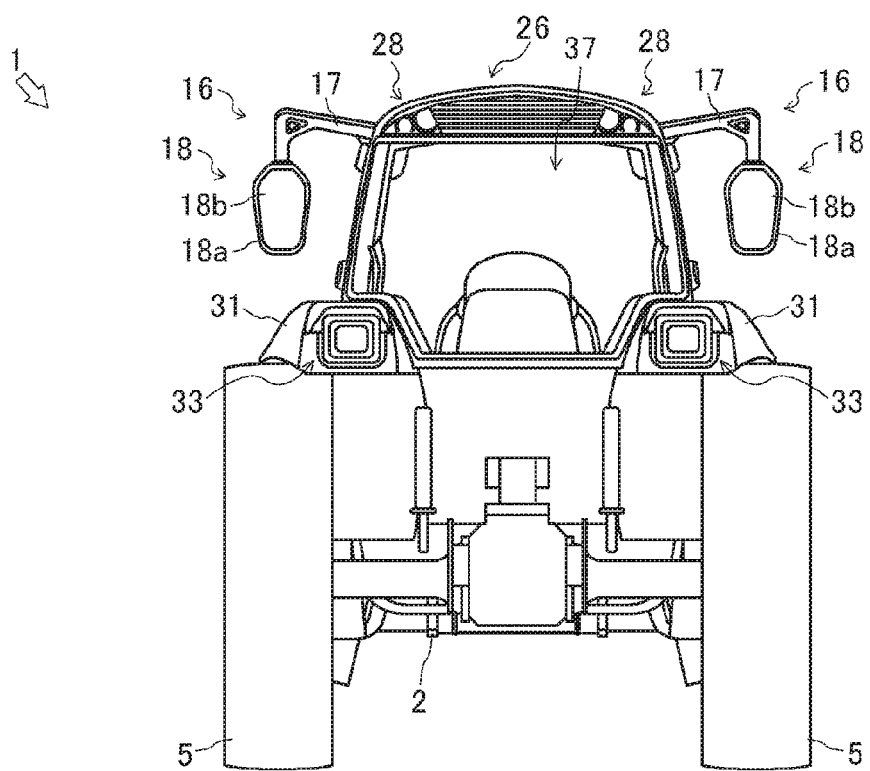
FIG. 8 is a rear view illustrating the entire constitution of the tractor according to the embodiment of the present invention.
Figure 26:
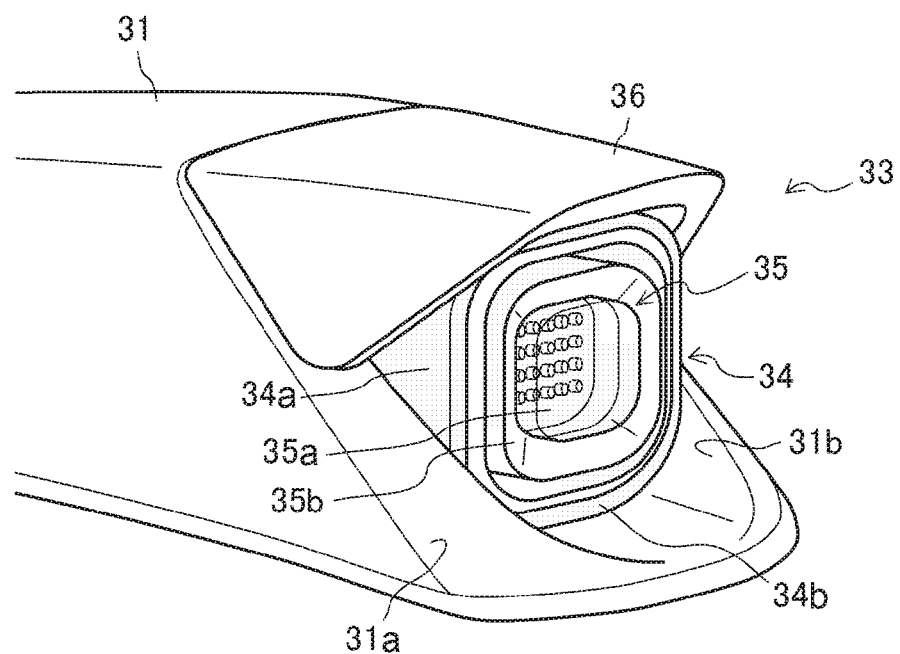
FIG. 26 is a partial enlarged perspective rear view illustrating the constitution of a combination lamp of the tractor according to the embodiment of the present invention.

As illustrated in FIGS. 2, 8, and 26, the combination lamps 33 are made up of a combination of direction indicators 34 and brake lamps 35 and integrally formed. The combination lamps 33 are respectively provided at the rear ends of the fender 31 on both right and left sides in such a manner as to irradiate light to the rear. The combination lamps 33 are covered with combination lamp covers 36.

The combination lamps 33 are formed in an approximately rectangular parallelepiped. Regarding the combination lamps 33, an outer circumferential surface 34a in the right-left direction and an outer edge portion 34b (hatching portions in FIG. 26) of the rear side surface are constituted as the direction indicators 34. The direction indicators 34 are constituted such that the outer circumferential surface 34a and the outer edge portion 34b emit light. The direction indicators 34 are configured to light up when the brakes are used.

Regarding the combination lamps 33, an inner side portion 35a of the outer edge portion 34b on the rear side surface is constituted as the brake lamp 35. Regarding the brake lamp 35, the inner side portion 35a (the hatching portions in FIG. 26) emits light, and a reflector 35b is constituted on its periphery. The light source of the brake lamp 35 is constituted of LEDs. It is noted that the light source of the brake lamp 35 is not limited to the LEDs. The combination lamps 33 is constituted in dual structure in which the outer circumferential surface 34a and the outer edge portion 34b on the rear side surface, and the inner side portion 35a can individually light up.

Regarding the combination lamps 33, the front end portion thereof is inserted into a rear concave portion 31b formed on an inclined surface 31a of the fender 31 and provided approximately horizontally. That is, the combination lamps 33 are provided in such a manner as to be hidden in the interior of the fenders 31 from an upper part of the front end to a lower part of the rear end of the fenders 31. Regarding the combination lamps 33, the lateral surface on the upper side thereof and part of the lateral surface (the outer circumferential surface 34a of the direction indicator 34) in the right-left direction are covered with the combination lamp cover 36. The combination lamp cover 36 is mounted on the inclined surface 31a of the fender 31. The combination lamp cover 36 is formed in such a manner as to extend with respect to the rear end of the combination lamp 33 while facing the rear from the midway portion of the inclined surface 31a of the fender 31.

The rear end portion of the combination lamp cover 36 is formed in such a manner as to be inclined upward from the midway portion of the inclination (the inclined surface 31a) of the rear end of the fender 31 when viewed from a lateral surface. That is, the combination lamps 33 is constituted in such a manner that the outer circumferential surface 34a of the direction indicator 34 can be visually recognized from between the inclination of the rear end of the combination lamp cover 36 with respect to the lateral side of the tractor 1 and the inclination of the fender 31.

Figure 27A:
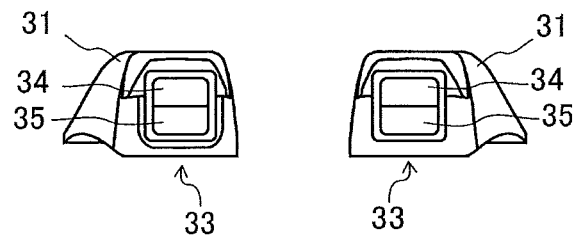
FIG. 27A is a partial rear view illustrating the constitution of the combination lamp according to a first embodiment of the present invention.
Figure 27B:
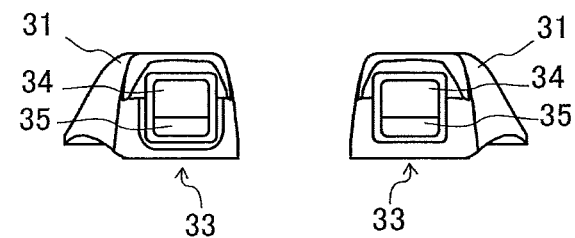
FIG. 27B is a partial rear view illustrating the constitution of the combination lamp according to a second embodiment of the present invention.
Figure 27C:
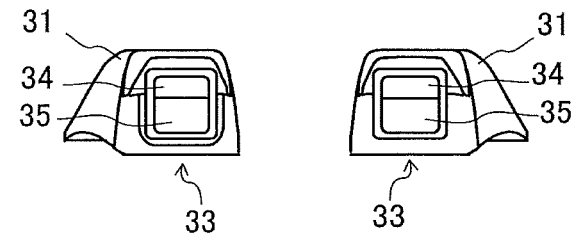
FIG. 27C is a partial rear view illustrating the constitution of the combination lamp according to a third embodiment of the present invention.
Figure 27D:
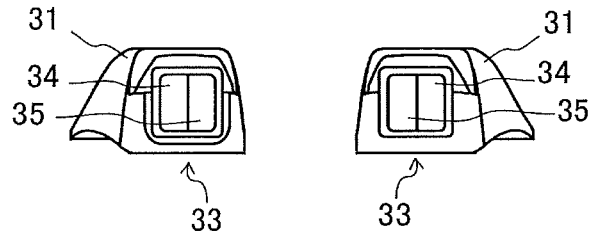
FIG. 27D is a partial rear view illustrating the constitution of the combination lamp according to a fourth embodiment of the present invention.

It is noted that the mode of the direction indicator 34 and the brake lamp 35 in the combination lamp 33 is not limited to this. As another embodiment of the combination lamp 33, as illustrated in FIG. 27A, it may be constituted such that the combination lamps 33 are equally divided into upper and lower sections, and that the direction indicators 34 are arranged on one of the upper and lower sections, and the brake lamps 35 are arranged on the other of the upper and lower sections. Also, as illustrated in FIGS. 27B and 27C, it may be constituted such that the size of one of the upper and lower sections divided is larger than the size of the other of the upper and lower sections, and that the direction indicators 34 are arranged on one of the upper and lower sections, and the brake lamps 35 are arranged on the other of the upper and lower sections. Also, as illustrated in FIG. 27D, it may be constituted such that the combination lamps 33 are equally or unequally divided into right and left sections, and that the direction indicators 34 are arranged on the left side surface of the combination lamp 33 on the left side and the right side surface of the combination lamp 33 on the right side.

With this constitution in the aforementioned manner, regarding the tractor 1, a shadow is formed in the combination lamp 33 by means of the combination lamp cover 36. Also, regarding the tractor 1, the adhesion of dirt on the combination lamps 33 is reduced by the combination lamp covers 36. Accordingly, regarding the tractor 1, the direction indicators 34 of the combination lamps 33 can be visually recognized from both sides in the right-left direction while the visibility of the combination lamps 33 from the rear is improved.

Next, the drive operating unit 37 will be described referring to FIGS. 1, 2, and 28.

Figure 28:
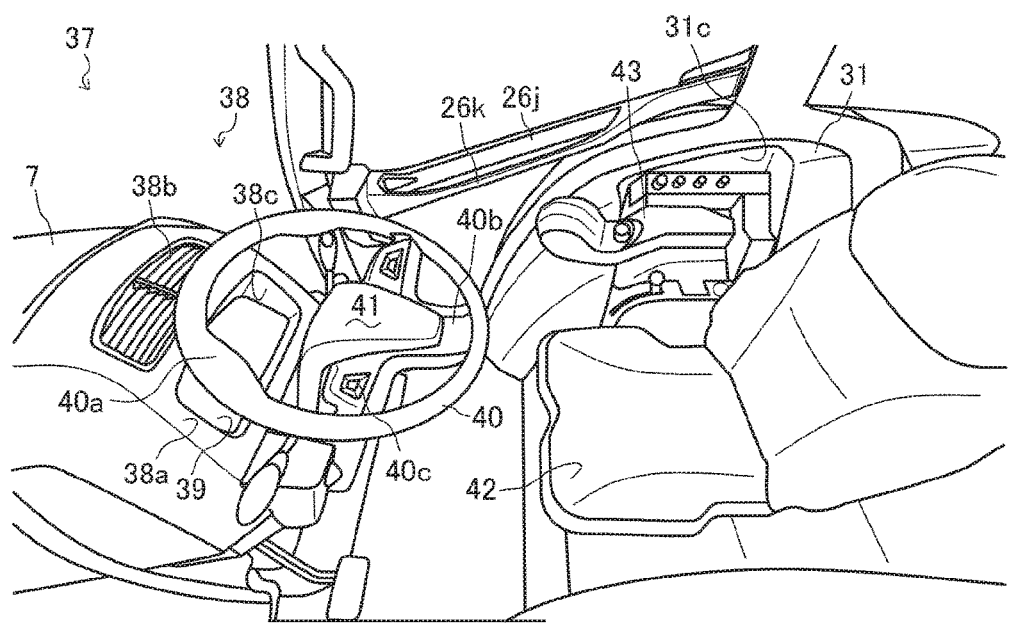
FIG. 28 is a partial enlarged perspective view illustrating the constitution of the drive operating unit of the tractor according to the embodiment of the present invention.

As illustrated in FIGS. 1, 2, and 28, the drive operating unit 37 performs various operations used for operating the tractor 1. The drive operating unit 37 is provided in the interior of the cabin 26. The drive operating unit 37 includes the instrumental panel 38, a steering handle 40, the operating seat 42, an operating panel 43, and the like.

A variety of operating instruments and measuring instruments are arranged in the instrumental panel 38. The instrumental panel 38 is provided in the center in the right-left direction of the front in the cabin 26. The instrumental panel 38 is connected to the rear end of hood 7. The instrumental panel 38 is formed approximately in the same shape made up of the upper surface 7a, the upper left surface 7b, the upper right surface 7c, the left surface 7d, and the right surface 7e of the hood 7 (see FIG. 10). That is, the instrumental panel 38 is continuously connected to the rear end of the hood 7 without steps. Regarding the instrumental panel 38, the inclined surface 38a that tilts downward from the connection end with the hood 7 to the drive operating unit 37 in the cabin 26 is formed. Regarding the instrumental panel 38, the inclined surface 38a is formed in such a manner as to face the operator who sits on the operating seat 42.

In the instrumental panel 38, an approximately rectangular air-conditioner discharge opening 38b, whose longitudinal direction is the right-left direction, is formed in the vicinity of the connection portion with the hood 7, that is, in the front end portion of the instrumental panel 38. A concave portion 38c is formed below the air-conditioner discharge opening 38b. A touch panel 39 is provided in the concave portion 38c.

The touch panel 39 displays and operates various instruments and operating switches such as a travelling speeds, engine revolutions, fuel gauges, and water temperature gauges. The touch panel 39 is provided in such a manner as to form a gentle angle (in such a manner as to form a slight angle with respect to the horizontal surface) with respect to the inclined surface 38a of the instrumental panel 38. That is, the touch panel 39 is provided in the instrumental panel 38 in such a manner that the depth of the concave portion 38c increases as the concave portion 38c advances to the front. Accordingly, the touch panel 39 is constituted in such a manner that the light shined in from the front on a screen is not incident by means of the inclined surface 38a of the instrumental panel 38.

The steering handle 40 is used to operate the tractor 1. The steering handle 40 is provided adjacent to the rear of the instrumental panel 38. The steering handle 40 is constituted in such a manner that the height thereof is approximately the same with that of the instrumental panel 38. Regarding the steering handle 40, a convex portion 40a is formed wherein the right side front and the left side front face the center of the steering handle 40. The steering handle 40 is supported by a steering column 41 via a plurality of column brackets 40b.

Regarding the steering handle 40, a switch group 40c for performing various operations is provided in the column brackets 40b. Regarding the steering handle 40, the column brackets 40b are connected to the both sides in the right-left direction and the side (rear side) of the operating seat 42. That is, the column brackets 40b are not arranged on the side (front side) of the instrumental panel 38 of the steering handle 40.

The operating seat 42 is provided in the rear of the steering handle 40 and between the right and left fenders 31. Also, the operating panel 43 that includes an operating lever of a variable speed gear is provided in one of the right and left fenders 31 of the operating seat 42. The operating panel 43 is arranged in a lateral concave portion 31c formed in the fender 31. That is, the operating panel 43 is integrally formed with the fender 31.

With this constitution in the aforementioned manner, regarding the tractor 1, it is easy for the operator to operate the touch panel 39 provided in the instrumental panel 38. Also, regarding the tractor 1, even when the steering handle 40 is provided near to the touch panel 39, the operator easily recognizes the display of the touch panel 39. Accordingly, the tractor 1 can improve the operability of the touch panel 39 provided in the instrumental panel 38.

INDUSTRIAL APPLICABILITY

The present invention can be applied to the technologies of work vehicles such as a tractor.

REFERENCE SIGNS LIST

1 Tractor
7 Hood
7a Upper surface
7b Upper left surface
7c Upper right surface
37 Drive operating unit

The invention claimed is:

1. A tractor comprising
a drive operating unit; and
a hood arranged in front of the drive operating unit, wherein the hood includes an upper surface formed in an approximately triangular shape in which an approximately center in a back-forth direction of the hood from a rear end of the hood is a vertex in a plane view;
an upper left surface formed in such a manner as to be abutted to a left side of the upper surface leading from the rear end of the hood to the vertex of the upper surface in the plane view; and
an upper right surface formed in such a manner as to be abutted to a right side of the upper surface leading from the rear end of the hood to the vertex of the upper surface in the plane view, wherein:

a height of the upper surface from ground is reduced from the rear end to a front end of the hood,
a height of the upper left surface from the ground is reduced from a center of the hood in a right-left direction to a left of the hood,
a height of the upper right surface from the ground is reduced from the center of the hood in the right-left direction to a right of the hood,
a ridge line is formed by the upper left surface and the upper right surface which converge at a center of a front portion of the hood in the plane view, and the ridge line descends from the vertex of the upper surface to the front end of the hood,
notch portions are formed at left and right sides of the front portion of the hood,
head lights are respectively protruded from the notch portions such that the head lights protrude in the right left direction of the hood, and
an interval between a left lateral surface of the hood and a right lateral surface of the hood increases from a rear end portion of the hood to a mid portion of the hood which substantially corresponds to a center portion of front wheels.

2. The tractor according to claim 1,
wherein the front end of the hood is formed in such a manner as to correspond to a shape of the rear end of the hood, and
wherein an instrument panel formed on an inclined surface that tilts downward from a front end to a rear end thereof is connected to the rear end of the hood.

3. The tractor according to claim 1, wherein the front end of the hood is formed by the ridge line, a bottom edge of the upper left surface, and a bottom edge of the upper right surface.

4. The tractor according to claim 1, wherein the ridge line extends continuously from the vertex to a front end of the hood.

5. The tractor according to claim 1, wherein the front end of the hood is a farthest portion forward of the hood and is positioned opposite the rear end of the hood.

6. A tractor comprising
a drive operating unit; and
a hood arranged in front of the drive operating unit, the hood comprises an upper surface, an upper left surface, and an upper right surface wherein:
the upper surface is formed in an approximately triangular shape in which an approximately center in a back-forth direction of the hood from a rear end of the hood is a vertex in a plane view,
a height of the upper surface from ground is reduced from the rear end to a front end of the hood,
the upper left surface is abutted to the upper surface to form a left ridge line from the rear end of the hood to the vertex,
a height of the upper left surface from the ground is reduced from a center of the hood in a right-left direction to a left of the hood,
the upper right surface is abutted to the upper surface to from a right ridge line from the rear end of the hood to the vertex,
a height of the upper right surface from the ground is reduced from the center of the hood in the right-left direction to a right of the hood,
the upper left surface is abutted to the upper right surface to form a front ridge line that continuously extends between the vertex and the front end of the hood, and a lateral width between a bottom edge of the upper left surface and a bottom edge of the upper right surface increases from a rear end portion of the hood to a mid portion of the hood.

7. The tractor according to claim 6, wherein the mid portion of the hood substantially corresponds to a center portion of front wheels of the tractor.

8. The tractor according to claim 6, wherein the hood further comprises a left side surface and a right side surface.

9. The tractor according to claim 8, wherein:
   the left side surface abuts the upper left surface to form a left side ridge line; and
   the right side surface abuts the upper right surface to form a right side ridge line.

10. The tractor according to claim 9, wherein:
    a left notch portion is formed between the left side surface and the upper left surface; and
    a left headlight is positioned in and protrudes laterally outward from the left notch portion.

11. The tractor according to claim 9, wherein:
    a right notch portion is formed between the right side surface and the upper right surface; and
    a right headlight is positioned in and protrudes laterally outward from the right notch portion.

\* \* \* \* \*